US011865904B2

(12) United States Patent
Geum et al.

(10) Patent No.: US 11,865,904 B2
(45) Date of Patent: Jan. 9, 2024

(54) AUTOMATIC LIGHT BLOCKING DEVICE FOR VEHICLE

(71) Applicant: Young Sung Geum, Jeonju-si (KR)

(72) Inventors: Young Sung Geum, Jeonju-si (KR); Tae Ho Keum, Jeonju-si (KR)

(73) Assignee: Young Sung Geum, Jeonju-si (KR)

( * ) Notice: Subject to any disclaimer, the term of this patent is extended or adjusted under 35 U.S.C. 154(b) by 288 days.

(21) Appl. No.: 17/297,375

(22) PCT Filed: Nov. 21, 2019

(86) PCT No.: PCT/KR2019/016056
§ 371 (c)(1),
(2) Date: May 26, 2021

(87) PCT Pub. No.: WO2020/111661
PCT Pub. Date: Jun. 4, 2020

(65) Prior Publication Data
US 2022/0024288 A1  Jan. 27, 2022

(30) Foreign Application Priority Data
Nov. 26, 2018  (KR) .......................... 10-2018-0146978

(51) Int. Cl.
*B60J 7/057* (2006.01)
*B60J 7/00* (2006.01)
(Continued)

(52) U.S. Cl.
CPC ........... *B60J 7/0573* (2013.01); *B60J 7/0038* (2013.01); *B60Q 3/53* (2017.02); *B60R 11/00* (2013.01);
(Continued)

(58) Field of Classification Search
CPC ..... B60J 7/00; B60J 7/022; B60J 7/047; B60J 7/007; B60J 7/003; B60J 7/0573;
(Continued)

(56) References Cited
U.S. PATENT DOCUMENTS
4,848,827 A *  7/1989  Ou ........................... B60J 11/00
296/99.1

FOREIGN PATENT DOCUMENTS
CN       106143089 A    11/2016
JP       2803124 B2 *   9/1998   ................ B60J 3/02
(Continued)

OTHER PUBLICATIONS
Ichikawa et al. "Motor-driven slide type sun visor", Published: Sep. 24, 1998, Publisher: Japanese Patent Office, Edition: JP2803124B2 (Year: 1998).*
(Continued)

*Primary Examiner* — Amy R Weisberg
*Assistant Examiner* — Joyce Eileen Hill
(74) *Attorney, Agent, or Firm* — Bridgeway IP Law Group, PLLC; Sang Ho Lee; Hyun Woo Shin

(57) ABSTRACT

Provided is an automatic light blocking device for a vehicle, wherein a light blocking slider protrudes in a sliding manner from the ceiling or roof of the vehicle in order to block sunlight shining into the interior of the vehicle. To this end, an automatic light blocking device for a vehicle comprises: a light blocking body provided on the ceiling or roof of the vehicle and having at least one sliding groove which is open in the direction in which light is to be blocked; a light blocking slider which is slidably inserted into and coupled to the sliding groove; and a driving unit for sliding the light blocking slider along the light blocking body by using power applied from the vehicle.

13 Claims, 21 Drawing Sheets

(51) Int. Cl.
    *B60Q 3/53*           (2017.01)
    *B60R 11/00*        (2006.01)

(52) U.S. Cl.
    CPC ........ *B60J 7/003* (2013.01); *B60R 2011/0028* (2013.01); *B60R 2011/0057* (2013.01)

(58) Field of Classification Search
    CPC . B60J 7/0038; B60J 7/143; B60J 7/196; B60J 3/002; B60J 3/005; B60Q 3/50; B60Q 3/53; B60R 11/00; B60R 2011/0028; B60R 2011/0057; B60S 1/66; F16H 19/00; F16H 19/02; F16H 19/04
    USPC .............. 296/223, 26.13, 77.1, 99.1, 136.01, 296/136.04, 136.06, 216.04, 220.01
    See application file for complete search history.

(56) References Cited

FOREIGN PATENT DOCUMENTS

| KR | 20-0217970 | Y1 | | 3/2001 | |
|---|---|---|---|---|---|
| KR | 20-0409405 | Y1 | | 2/2006 | |
| KR | 200409405 | Y1 | * | 2/2006 | |
| KR | 10-2013-0033405 | A | | 4/2013 | |
| KR | 2013033405 | A | * | 4/2013 | ........... B60Q 1/2611 |
| KR | 20050008168 | A | * | 7/2014 | |
| KR | 10-1629013 | B1 | | 6/2016 | |
| KR | 101745941 | B1 | * | 6/2017 | ............. H02S 20/30 |

OTHER PUBLICATIONS

Han et al., "Stand-alone photovoltaic apparratus", Published Jun. 13, 2017, Publisher: Korean Patent Office, Edition: KR101745941B1 (Year: 2017).*

Kim, "Safety Sign Board For Vehicle", Published: Apr. 3, 2013, Publisher: Korean Patent Office, Edition: KR20130033405A (Year: 2013).*

Kim, "A rainwater control apparatus for preventing from flowing into vehicle", Published Feb. 22, 2006, Publisher: Korean Patent Office , Edition: KR200409405Y1 (Year: 2006).*

Ju, "Sunvisor for vehicle", Published: Jan. 21, 2005, Publisher: Korean Patent Office, Edition: KR20050008168A (Year: 2005).*

* cited by examiner

AUTOMATIC LIGHT BLOCKING DEVICE FOR VEHICLE

TECHNICAL FIELD

The present disclosure relates to an automatic light blocking device for vehicle, and more particularly, to an automatic light blocking device for vehicle in which a light blocking slider protrudes in a sliding manner from a ceiling or roof of a vehicle and blocks sunlight from being emitted to an interior of the vehicle.

RELATED ART

In general, vehicle glass passes strong sunlight as is and all passengers including a driver are exposed to ultraviolet rays. In particular, in summer, an air conditioner is turned on strongly due to hot sunlight in the middle of the day. Alternatively, depending on cases, cellophane paper for blocking sunlight is attached to the glass.

To solve this, a light blocking method in a form of attaching a liquid crystal display (LCD) to the front window of a vehicle is proposed. However, the existing art simply limits application of an LCD and does not present a method of concretely and effectively applying an LCD in terms of user convenience or safety.

The related art includes Korean Patent Registration No. 10-1629013 (titled "Shading device of vehicle", registered on Jun. 22, 2016).

DETAILED DESCRIPTION

Object

The present disclosure is conceived to solve the aforementioned issues, and provides an automatic light blocking device for vehicle in which a light blocking slider protrudes in a sliding manner from a ceiling or roof of a vehicle and blocks sunlight from being emitted to an interior of the vehicle.

Solution

According to an example embodiment to accomplish the aforementioned purposes of the present disclosure, an automatic light blocking device for vehicle according to the present disclosure includes an automatic light blocking device for vehicle, the automatic light blocking device including a light blocking body provided to a ceiling or roof of a vehicle and having at least one sliding groove that is open in a direction in which light is to be blocked; a light blocking slider configured to slidably insert into and couple to the sliding groove; and a driving unit configured to slide the light blocking slider in the light blocking body with power applied from the vehicle or power of a battery provided to the light blocking body.

Here, the light blocking slider includes a driving groove portion formed in parallel to a sliding direction of the light blocking slider in correspondence to a sliding amount of the light blocking slider; and a driving rack portion provided to one side of the driving groove portion.

Also, the driving unit includes a driving portion configured to generate a rotational force with the power applied from the vehicle or the power of the battery provided to the light blocking body; a driving shaft configured to rotate with the rotational force generated by the driving portion; and a driving gear configured to couple to the driving shaft and to engage with the driving rack portion in a state of being inserted into the driving groove portion.

Here, the sliding groove includes at least a first sliding groove and a second sliding groove among the first sliding groove provided adjacent to the ceiling or roof of the vehicle and open in a first direction; the second sliding groove stacked above the first sliding groove to be separate therefrom and open in a second direction opposite to the first direction or crossing the first direction; a third sliding groove stacked above the second sliding groove to be separate therefrom and open in a third direction opposite to the second direction or crossing the second direction; and a fourth sliding groove stacked above the third sliding groove to be separate therefrom and open in a fourth direction opposite to the third direction or crossing the third direction.

Also, the light blocking slider includes at least a first slider and a second slider among the first slider configured to slidably insert into and couple to the first groove; the second slider configured to slidably insert into and couple to the second groove; a third slider configured to slidably insert into and couple to the third groove; and a fourth slider configured to slidably insert into and couple to the fourth groove.

Also, the driving unit includes at least a first unit and a second unit among the first unit configured to slide the first slider in the light blocking body; the second unit configured to slide the second slider in the light blocking body; a third unit configured to slide the third slider in the light blocking body; and a fourth unit configured to slide the fourth slider in the light blocking body.

The automatic light blocking device according to the present disclosure further includes a guide unit configured to guide a sliding of the light blocking slider in the light blocking body.

Here, the guide unit includes a guide groove portion provided to one side or both sides of the light blocking slider parallel to the sliding direction of the light blocking slider; a guide roller portion configured to rotatably insert into and couple to the guide groove portion; and a guide shaft portion configured to form a center of rotation of the guide roller portion and to connect the guide roller portion to the light blocking slider, and a portion of the guide roller portion protrudes from the light blocking slider and is supported by an inner wall of the sliding groove.

Also, the guide unit includes a guide protrusion portion configured to be separate from one side or both sides of the driving unit to be parallel to the sliding direction of the light blocking slider and to protrude from one of the light blocking body and the light blocking slider; and a guide slit portion formed in a recessed form in the other one of the light blocking body and the light blocking slider to be slidable in a state of being inserted into and coupled to the guide protrusion portion.

The automatic light blocking device according to the present disclosure further includes a detachable unit configured to detachably couple the light blocking body to the ceiling or roof of the vehicle using a magnetic force.

Here, the detachable unit includes a switching block provided to the light blocking body in a state in which a switching hole is penetrated or recessed; a permanent magnet having a magnetic force and configured to rotatably insert into and couple to the switching hole; and a switching lever configured to couple to the permanent magnet for forward and reverse rotation of the permanent magnet, and the switching block is magnetized by the permanent magnet or the magnetized switching block is demagnetized according to the forward and reverse rotation of the permanent magnet.

The automatic light blocking device according to the present disclosure further includes a lighting unit provided in an upper portion of the light blocking body or provided to the light blocking slider and configured to emit light with the power applied from the vehicle or the power of the battery provided to the light blocking body.

For example, the lighting unit includes a light emitting substrate provided at a protruding end of the light blocking slider and to which the power applied from the vehicle or the power of the battery provided to the light blocking body is applied; a light emitting portion arranged on the light emitting substrate and configured to emit light with the power; and a lighting switch configured to adjust whether to apply the power to the light emitting substrate or illuminance of the light emitting portion.

As another example, the lighting unit includes a light emitting housing provided on the light blocking body; a light emitting substrate provided to the light emitting housing and to which the power applied from the vehicle or the power of the battery provided to the light blocking body is applied; a light emitting portion arranged on the light emitting substrate and configured to emit light with the power, and a lighting switch configured to adjust whether to apply the power to the light emitting substrate or illuminance of the light emitting portion.

Here, the driving portion and the driving shaft are configured to insert into the light blocking body.

Here, the light blocking slider is configured to form a downward slope by its own weight when the light blocking slider protrudes outward from the light blocking body.

Here, the light blocking slider includes a rack flow portion configured to communicate with the sliding groove, and the driving rack portion includes a sliding rack portion configured to slidably couple to the rack flow portion; and a rack coupling unit configured to slide the sliding rack portion based on the light blocking slider for detachably coupling of the sliding rack portion and the driving gear.

Here, the rack coupling unit includes a coupling rack portion configured to protrude from the sliding rack portion in the rack flow portion; a coupling rack guide portion configured to support the coupling rack portion to be slidable in the rack flow portion; a coupling pinion portion configured to gear-couple to the coupling rack portion in the rack flow portion; and a coupling pinion driving portion configured to rotate the coupling pinion portion in a state of being supported by the rack flow portion for sliding of the sliding rack portion.

The automatic light blocking device according to the present disclosure further includes a groove opening and closing unit configured to slidably couple to a side of the light blocking body and to open and close the sliding groove. The groove opening and closing unit includes an opening and closing door configured to slidably couple to the side of the light blocking body to correspond to the sliding groove; and a door driving portion configured to slide the opening and closing door with the power applied from the vehicle or the power of the battery provided to the light blocking body.

Here, the groove opening and closing unit further includes at least one of a light emitting housing provided on the light blocking body to support the opening and closing door to be slidable; and a door path groove formed in a recessed form on the side of the light blocking body such that the opening and closing door is inserted and supported to support the opening and closing door to be slidable.

Effect

According to an automatic light blocking device for vehicle according to the present disclosure, since a light blocking slider protrudes in a sliding manner from a ceiling or roof of a vehicle, it is possible to block sunlight from being emitted to an interior of the vehicle.

Also, according to the present disclosure, since at least two light blocking sliders are provided, it is possible to block sunlight in at least two directions among front, rear, left, and right based on front of a driver.

Also, according to the present disclosure, since a light blocking body is installed on a ceiling or roof of a vehicle, it is possible to block sunlight from being emitted toward the ceiling or roof and to prevent an excessive increase in an indoor temperature of the vehicle by reducing radiant heat generated by the sunlight.

Also, according to the present disclosure, it is possible to limit a protruding amount of a light blocking slider from a light blocking body and to prevent a light blocking slider from being separated from the light blocking body through a locking protrusion.

Also, according to the present disclosure, when a light blocking slider slides through a guide unit and an installation position of a driving groove, it is possible to minimize the eccentric load and to prevent the light blocking slider from rotating based on a driving gear.

Also, according to the present disclosure, it is possible to stabilize sliding of a light blocking slider in a light blocking body and to suppress or prevent flow of the light blocking slider through a guide unit.

Also, according to the present disclosure, it is possible to simplify attachment or detachment of a light blocking body to or from a ceiling or roof of a vehicle and to stably fasten the light blocking body to the ceiling or roof of the vehicle through a detachable unit.

Also, according to the present disclosure, it is possible to improve fastening power of a light blocking body on a ceiling or roof of a vehicle made of a metal material through a detachable unit and to adjust a magnetic force of a permanent magnet on the ceiling or roof of the vehicle.

Also, according to the present disclosure, it is possible to automate sliding of a light blocking slider through a driving unit and to prevent a safety accident of a driver when the light blocking slider operates.

MODE

Figure 1:
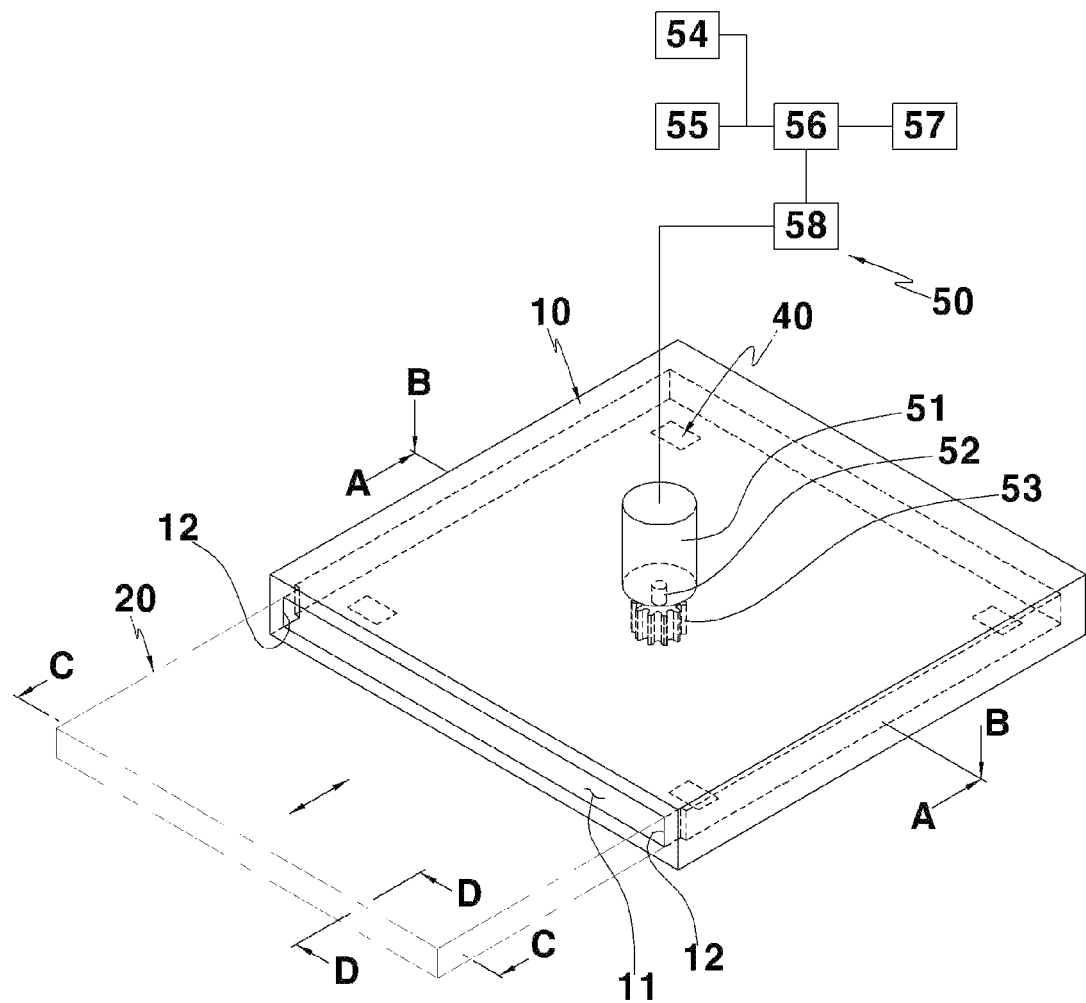
FIG. 1 is a perspective view illustrating an automatic light blocking device for vehicle according to a first embodiment of the present disclosure.
Figure 2:
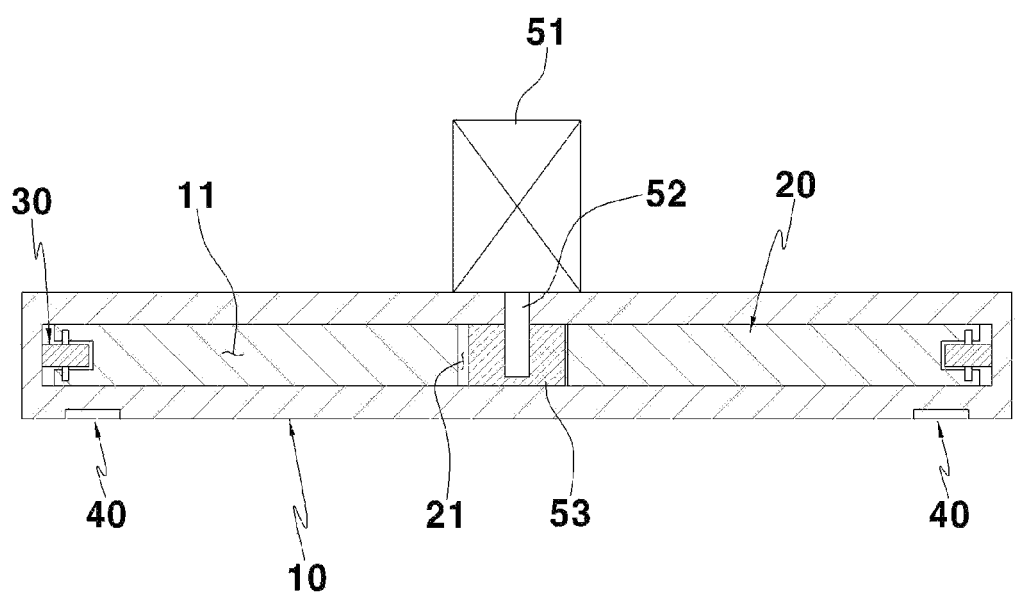
FIG. 2 is a longitudinal sectional view cut along a line A-A of FIG. 1.
Figure 3:
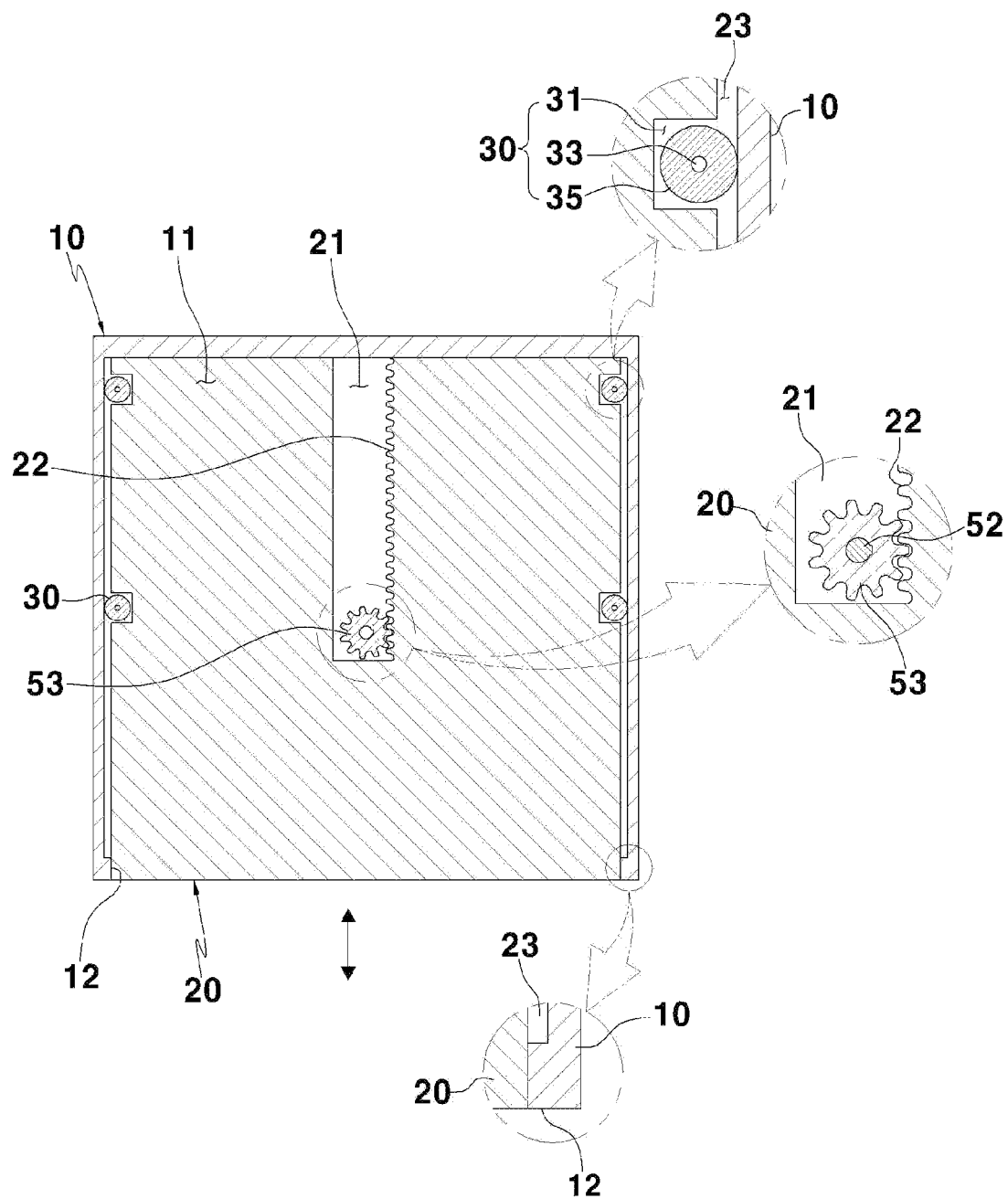
FIG. 3 is a cross-sectional view cut along a line B-B of FIG. 1.
Figure 4:
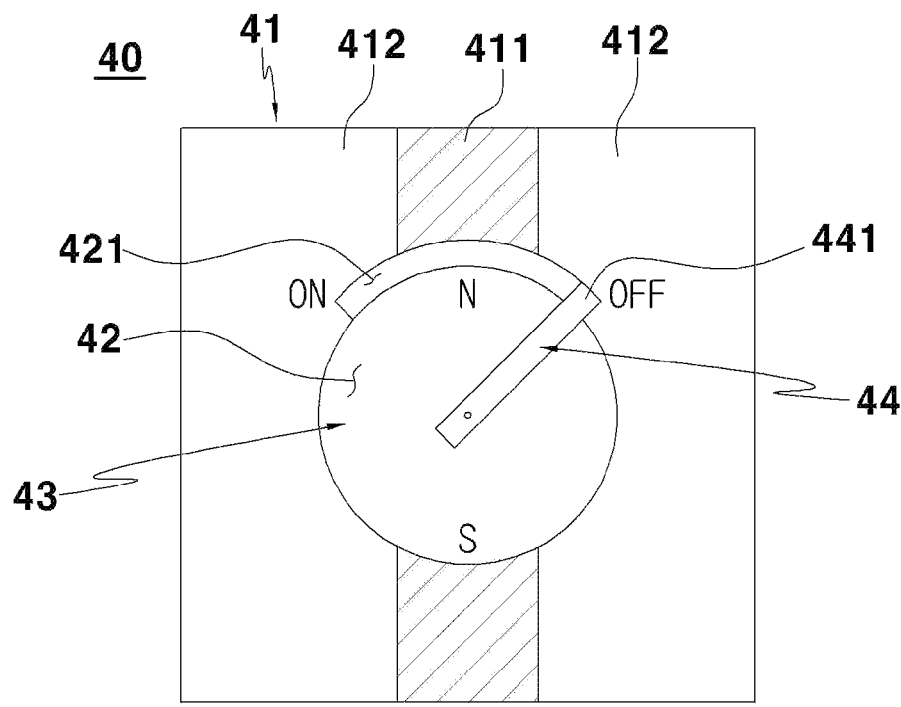
FIG. 4 is a front view illustrating a detachable unit in the automatic light blocking device for vehicle according to the first embodiment of the present disclosure.
Figure 5:
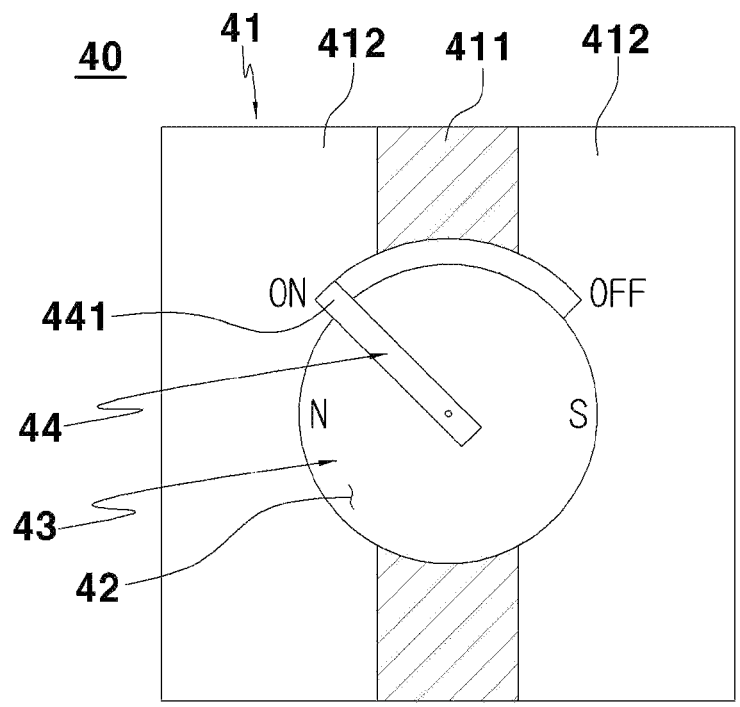
FIG. 5 illustrates an operation state of the detachable unit in the automatic light blocking device for vehicle according to the first embodiment of the present disclosure.

Hereinafter, an embodiment of an automatic light blocking device for vehicle according to the present disclosure is described with reference to the accompanying drawings. Here, the present disclosure is not limited to or restricted by the embodiments. Also, in describing the present disclosure, detailed description related to a known function or configuration may be omitted to clarify the subject matter of the present disclosure.

Referring to FIGS. 1 to 7, an automatic light blocking device for vehicle according to a first embodiment of the present disclosure includes a light blocking body 10 provided to a ceiling or roof of a vehicle and having at least one sliding groove 11 that is open in a direction in which light is to be blocked, a light blocking slider 20 configured to slidably insert into and couple to the sliding groove 11, and a driving unit 50 configured to slide the light blocking slider 20 in the light blocking body 10 with power applied from the vehicle or power of a battery (not shown) provided to the light blocking body 10.

In the first embodiment of the present disclosure, a single light blocking slider 20 is provided to the light blocking body 10. Although not illustrated, when the light blocking slider 20 protrudes outward from the light blocking body 10, the light blocking slider 20 may form a downward slope by its own weight. When the light blocking slider 20 inserts into the sliding groove 11, the light blocking slider 20 may restore to an original state. Therefore, it is possible to prevent rainwater or foreign substance from remaining on the light blocking slider 20 and to improve the cleanness of the light blocking slider 20. In particular, an end of the light blocking slider 20 that protrudes outward from the light blocking body 10 may form a downward slope by its own weight.

Here, the light blocking slider 20 may include a driving groove portion 21 formed in a penetrating or recessed form in parallel to a sliding direction of the light blocking slider 20 in correspondence to a sliding amount of the light blocking slider 20 and a driving rack portion 22 provided to one side of the driving groove portion 21. In the first embodiment of the present disclosure, a portion of the driving groove portion 21 facing an entrance of the sliding groove 11 is open, which may increase a protruding amount of the light blocking slider 20.

Also, the driving unit 50 may include a driving portion 51 configured to generate a rotational force with the power applied from the vehicle or the power of the battery (not shown) provided to the light blocking body 10, a driving shaft 52 configured to rotate with the rotational force generated by the driving portion 51, and a driving gear 53 configured to couple to the driving shaft 52 and to engage with the driving rack portion 22 in a state of being inserted into the driving groove portion 21. Here, a width of the driving groove portion 21 (an opening length of the driving groove portion 21 in a direction perpendicular to the sliding direction of the light blocking slider 20) may be formed to be greater than an outer diameter of the driving gear 53, which may allow the driving gear 53 to stably rotate in the driving groove portion 21 and may prevent the driving gear 53 from interfering with the light blocking slider 20 in the driving groove portion 21.

The automatic light blocking device for vehicle according to the first embodiment of the present disclosure may further include a guide unit 30 configured to guide a sliding of the light blocking slider 20 in the light blocking body 10.

The guide unit 30 may include a guide groove portion 31, a guide roller portion 35, and a guide shaft portion 33.

The guide groove portion 31 may be provided to one side or both sides of the light blocking slider 20 parallel to the sliding direction of the light blocking slider 20. One or at least two guide groove portions 31 may be provided in the sliding direction of the light blocking slider 20. The guide groove portion 31 is installed in 60% or less of an entire length of the light blocking slider 20, in detail, 50% or less of the entire length of the light blocking slider 20 from a portion facing the entrance of the sliding groove 11 in correspondence to the sliding direction of the light blocking slider 20, which may suppress or prevent flow of the light blocking slider 20 in the sliding groove 11.

The guide roller portion 35 rotatably inserts into and couples to the guide groove portion 31.

The guide shaft portion 33 forms a center of rotation of the guide roller portion 35. The guide shaft portion 33 connects the guide roller portion 35 to the light blocking slider 20.

Here, a portion of the guide roller portion 35 may protrude from the light blocking slider 20 and be supported by an inner wall of the sliding groove 11, which may suppress or prevent flow of the light blocking slider 20 in the sliding groove 11. According to protruding of the guide roller portion 35, a gap 13 is formed between the light blocking slider 20 and the inner wall of the sliding groove 11.

Also, a locking protrusion 12 configured to stop and support the guide roller portion 35 is protruded and formed at the entrance of the sliding groove 11 and may prevent the light blocking slider 20 from being separated from the sliding groove 11. A protruding length of the locking protrusion 12 is substantially identical to the gap 23. The locking protrusion 12 may include a stopping roller configured to rotatably couple to the light blocking body 10 by way of a stopping shaft, which is similar to the aforementioned guide unit 30.

In particular, since one side of the light blocking slider 20 is supported by the guide unit 30 and the locking protrusion 12 at two or more points in the sliding groove 11, it is possible to easily suppress and prevent flow of the light blocking slider 20.

The automatic light blocking device for vehicle according to the first embodiment of the present disclosure may further include a detachable unit 40. The detachable unit 40 is provided to the light blocking body 10. The detachable unit 40 detachably couples the light blocking body 10 to the ceiling or roof of the vehicle using a magnetic force.

The detachable unit 40 may include a switching block 41, a permanent magnet 43, and a switching lever 44.

The switching block 41 is provided to the light blocking body 10. A switching hole 42 is formed in a penetrating or recessed form in the switching block 41. The switching hole 42 may be provided at the center of the switching block 41. The switching block 41 may include a magnetic insulator 411 not magnetized by the magnetic force and provided in a normal direction of the switching hole 42 and a magnetic conductor 412 magnetized by the magnetic force and stacked and coupled to each of both sides of the magnetic insulator 411. The magnetic insulator 411 is provided in the normal direction of the switching hole 42 and exposed in the switching hole 42, and the magnetic conductor 412 is partially exposed in the switching hole 42 in a state in which the magnetic conductor 412 is stacked and coupled to each of both sides of the magnetic insulator 411. A detachable guide 421 configured to limit an amount of forward and backward rotation of the permanent magnet 43 may be provided to a portion of the switching hole 42.

The permanent magnet 43 has a magnetic force. A polarity direction of the permanent magnet 43 (a direction that connects an N pole and an S pole in the permanent magnet 43) matches the normal direction of the switching hole 42. The permanent magnet 43 is in a cylindrical shape and rotatably inserts into and couples to the switching hole 42.

A switching lever 44 couples to the permanent magnet 43 for the forward and reverse rotation of the permanent magnet 43. A switching protrusion portion 441 configured to insert into and couple to the detachable guide 421 to be movable in the detachable guide 421 may be provided to the switching lever 44. The switching lever 44 may rotate the permanent magnet 43 to the left or to the right by each 45 degrees based on the magnetic insulator 411.

A user may forward and reverse rotate the permanent magnet 43 in a state in which the user places the light blocking body 10 to the ceiling or roof of the vehicle and then grips the switching lever 44. When the switching block 41 is magnetized by the permanent magnet 43 in response to the forward and reverse rotation of the permanent magnet 43, the switching block 41 couples to the ceiling or roof the vehicle that is a metal material. When the switching block 41 magnetized by the permanent magnet 43 is demagnetized in response to the forward and backward rotation of the permanent magnet 43, the switching block 41 may be separated from the ceiling or roof of the vehicle that is a metal material.

In particular, when a polarity direction of the permanent magnet 43 crosses or is substantially perpendicular to a longitudinal direction of the magnetic insulator 411 in response to rotation of the permanent magnet 43, or when the polarity direction of the permanent magnet 43 is directed toward the magnetic conductor 412, the permanent magnet 43 may magnetize the switching block 41 by magnetizing the magnetic conductor 412.

Also, when the polarity direction of the permanent magnet 43 matches the longitudinal direction of the magnetic insulator 411 in response to rotation of the permanent magnet 43, or when the polarity direction of the permanent magnet 43 is directed toward the magnetic insulator 411, the magnetized switching block 41 may be demagnetized in such a manner that the magnetic conductor 412 is demagnetized.

In the first embodiment of the present disclosure, the driving unit 50 may further include an open detector 54 configured to detect a maximum protrusion state of the light blocking slider 20, a close detector 55 configured to detect a maximum insertion state of the light blocking slider 20, and a controller 56 configured to block power applied to the driving portion 51 based on a signal from the open detector 54 and the close detector 55.

Here, when the open detector 54 or the close detector 55 detects the light blocking slider 20 while the light blocking slider 20 is sliding, the controller 56 may stop sliding of the light blocking slider 20 by blocking the power being applied to the driving portion 51.

In the first embodiment of the present disclosure, the driving unit 50 may further include a driving switch 58 configured to select whether to apply power to the driving portion 51 or select forward and reverse rotation of the driving gear 53.

A reference numeral 57 not described herein refers to a power connector configured to connect the power applied from the vehicle or the power of the separate battery (not shown) provided to the light blocking body 10 to the controller 56 or the driving switch 58.

The automatic light blocking device for vehicle according to the first embodiment of the present disclosure may further include a lighting unit 60. The lighting unit 60 is provided to the light blocking slider 20. The lighting unit 60 may emit light by the power applied from the vehicle or the power of the separate battery (not shown) provided to the light blocking body 10. The lighting unit 60 may emit light toward the ground. The lighting unit 60 may select whether to emit light depending on whether the light blocking slider 20 protrudes. As another representation, the light may be emitted from the lighting unit 60 in a state in which the light blocking slider 20 is protruded and the power of the lighting unit 60 may be blocked in a state in which the light blocking slider 20 is inserted. The lighting unit 60 may select whether to emit the light based on surrounding illuminance. As another representation, the lighting unit 60 may not emit light during a daytime and may emit light after sunset. The lighting unit 60 may adjust the illuminance of light emitted based on the surrounding illuminance. The lighting unit 60 may adjust whether to emit light through a separate switch (not shown) or may adjust the illuminance of light emitted.

Figure 6:
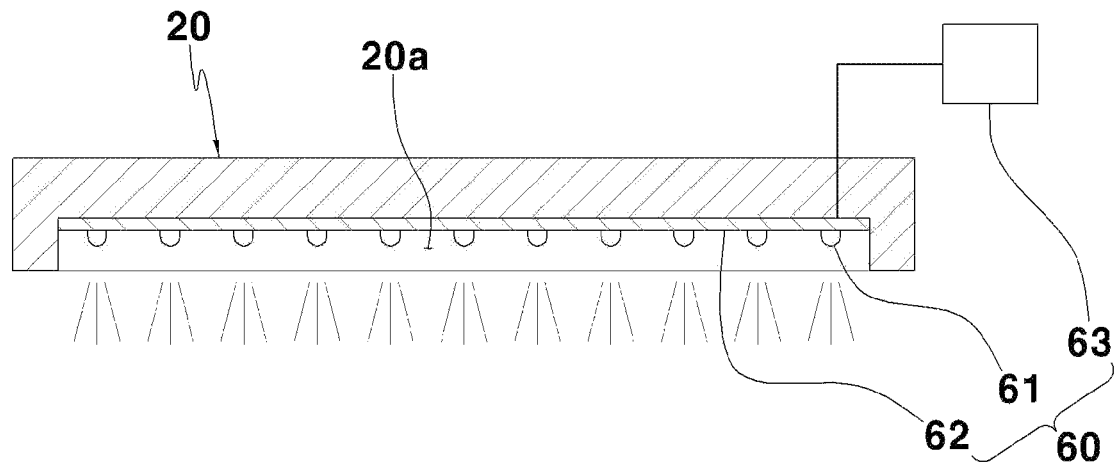
FIG. 6 is a longitudinal sectional view cut along a line C-C of FIG. 1.
Figure 7:
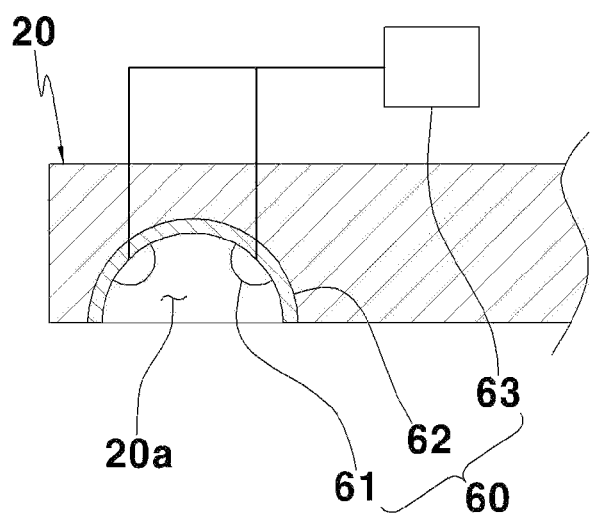
FIG. 7 is a longitudinal sectional view cut along a line D-D of FIG. 1.
Figure 8:
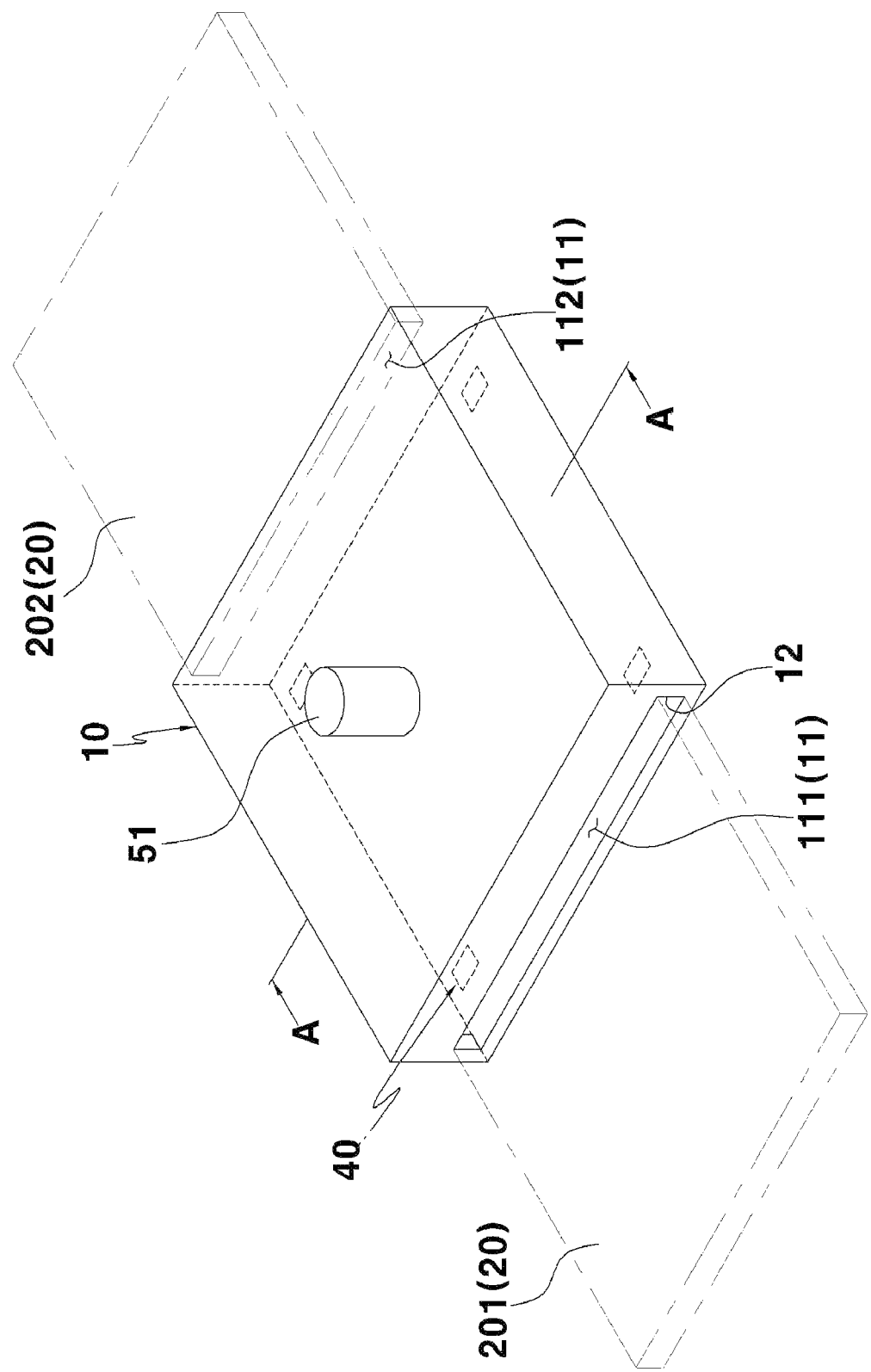
FIG. 8 is a perspective view illustrating a first modification example of the automatic light blocking device according to the first embodiment of the present disclosure.
Figure 9:
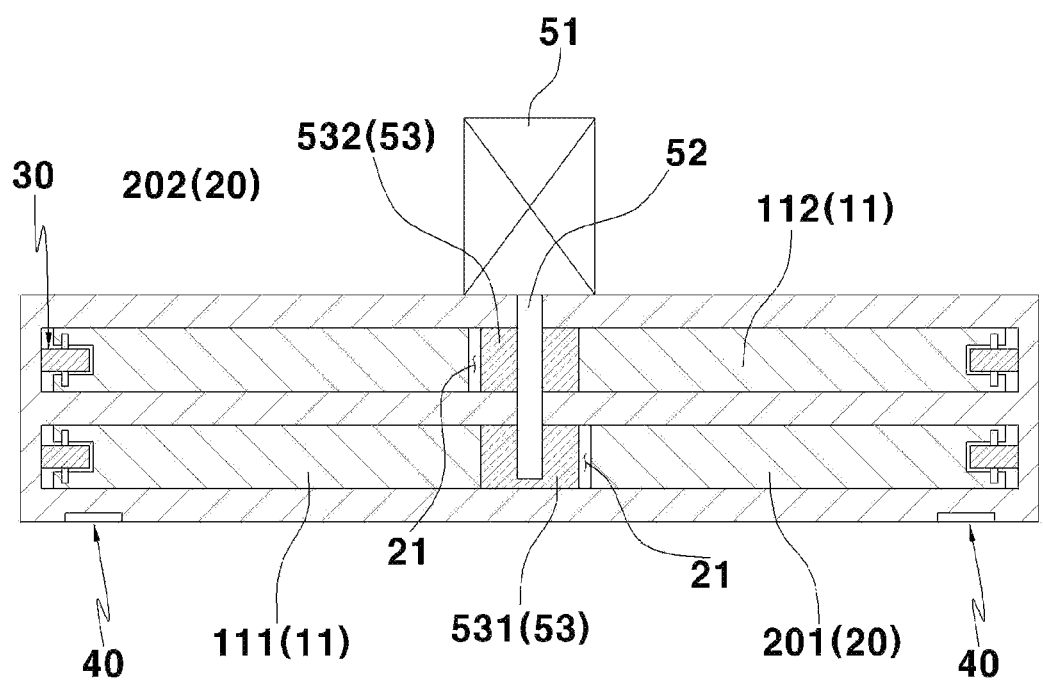
FIG. 9 is a longitudinal sectional view illustrating the first modification example in the automatic light blocking device for vehicle according to the first embodiment of the present disclosure.
Figure 10:
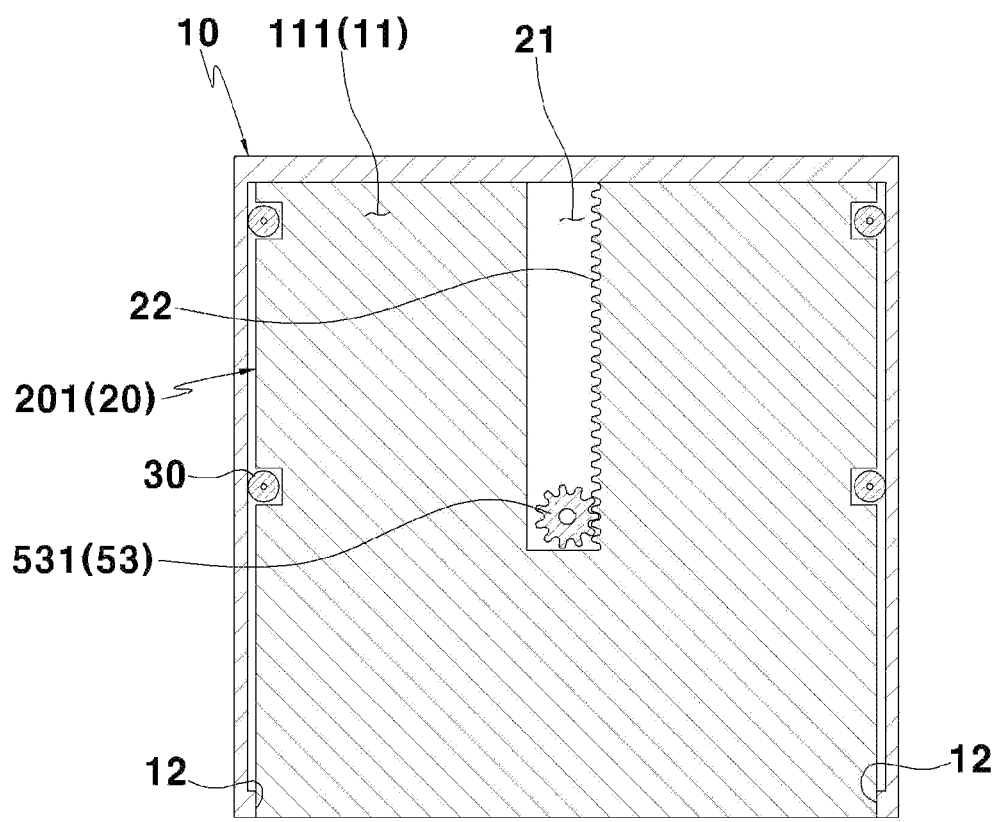
FIG. 10 is a plan sectional view illustrating an arrangement state of a first slider in a light blocking slider of the first modification example.
Figure 11:
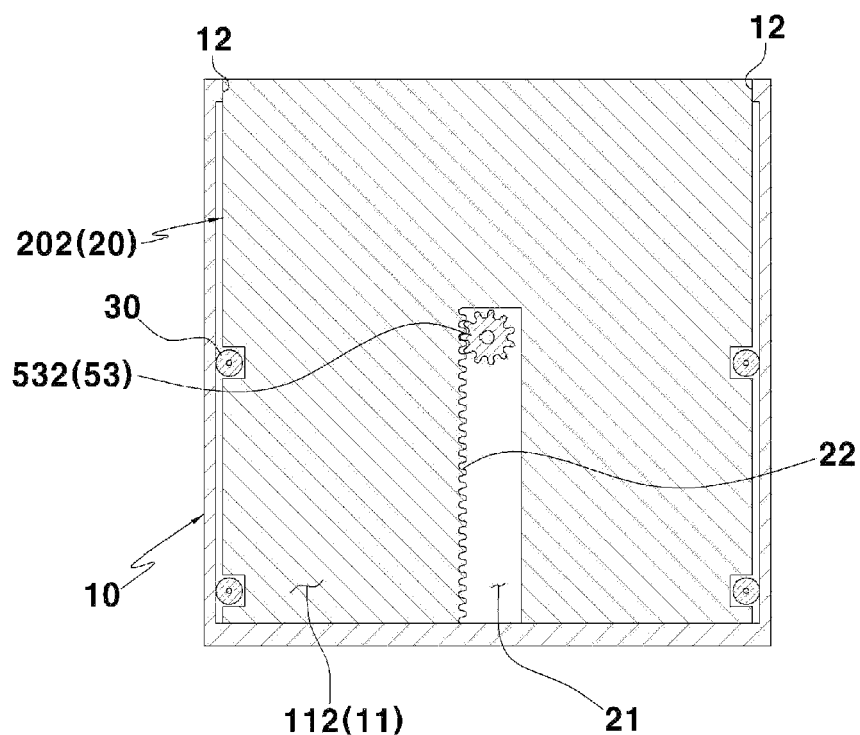
FIG. 11 is a plan sectional view illustrating an arrangement state of a second slider in the light blocking slider of the first modification example.
Figure 12:
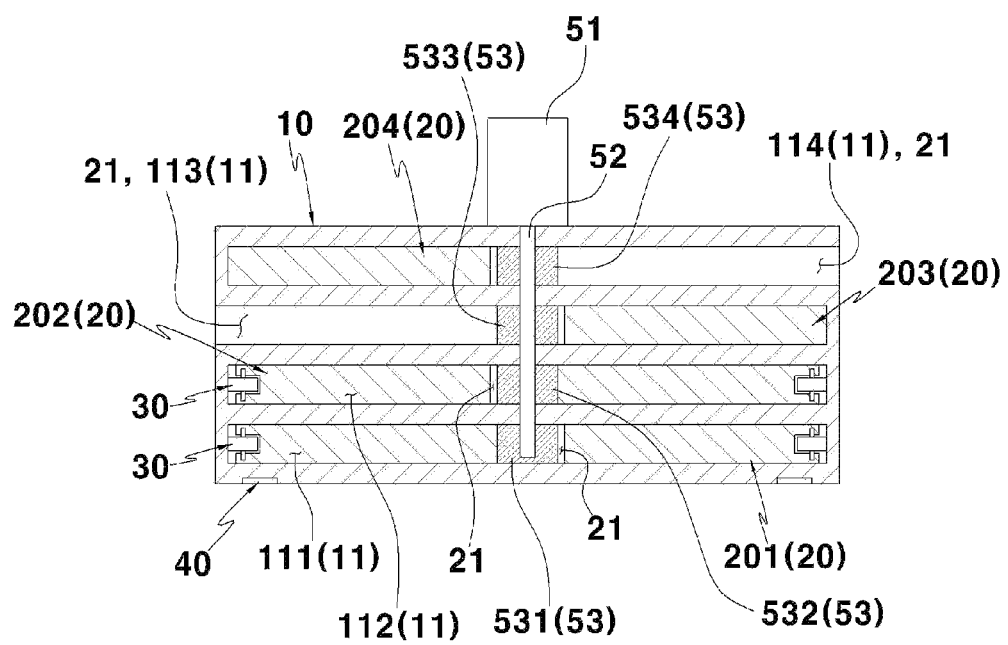
FIG. 12 is a longitudinal sectional view illustrating a second modification example in the automatic light blocking device for vehicle according to the first embodiment of the present disclosure.
Figure 13:
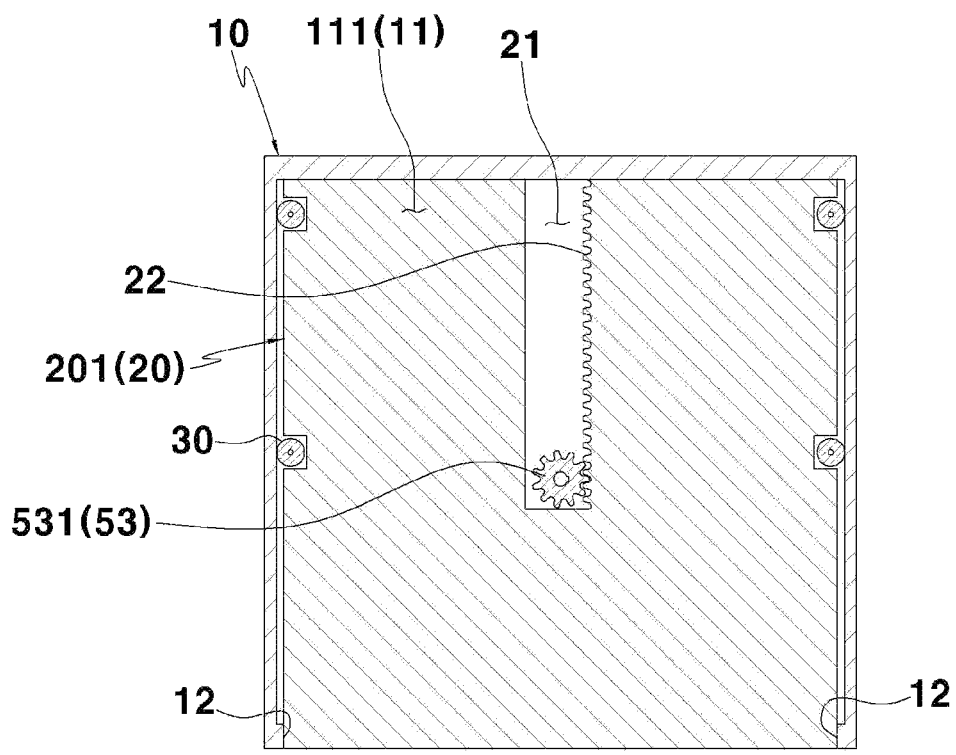
FIG. 13 is a plan sectional view illustrating an arrangement state of a first slider in a light blocking slider of the second modification example.
Figure 14:
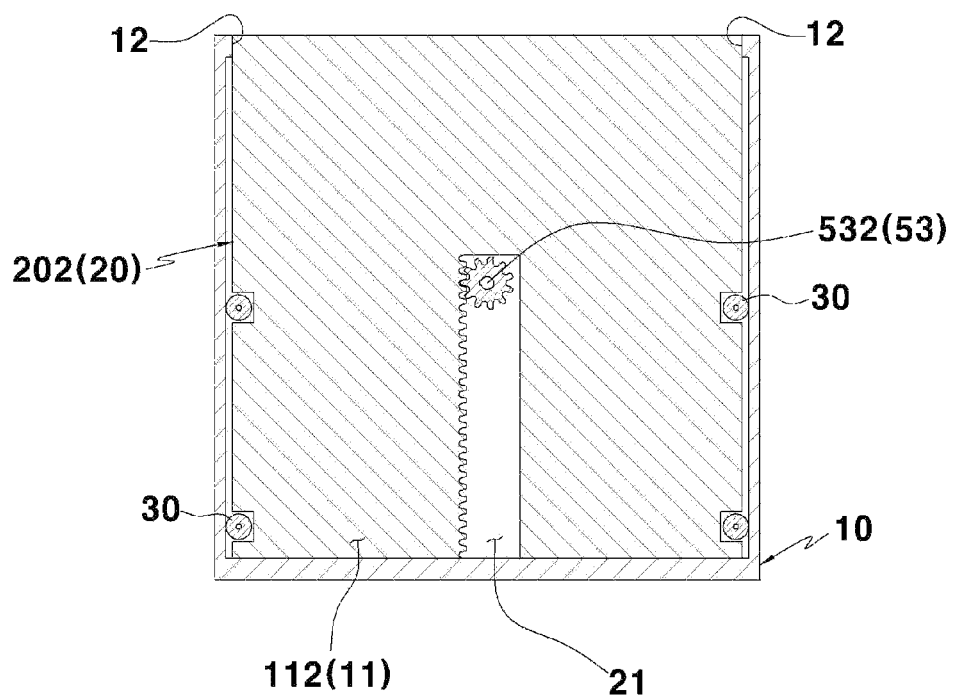
FIG. 14 is a plan sectional view illustrating an arrangement state of a second slider in the light blocking slider of the second modification example.
Figure 15:
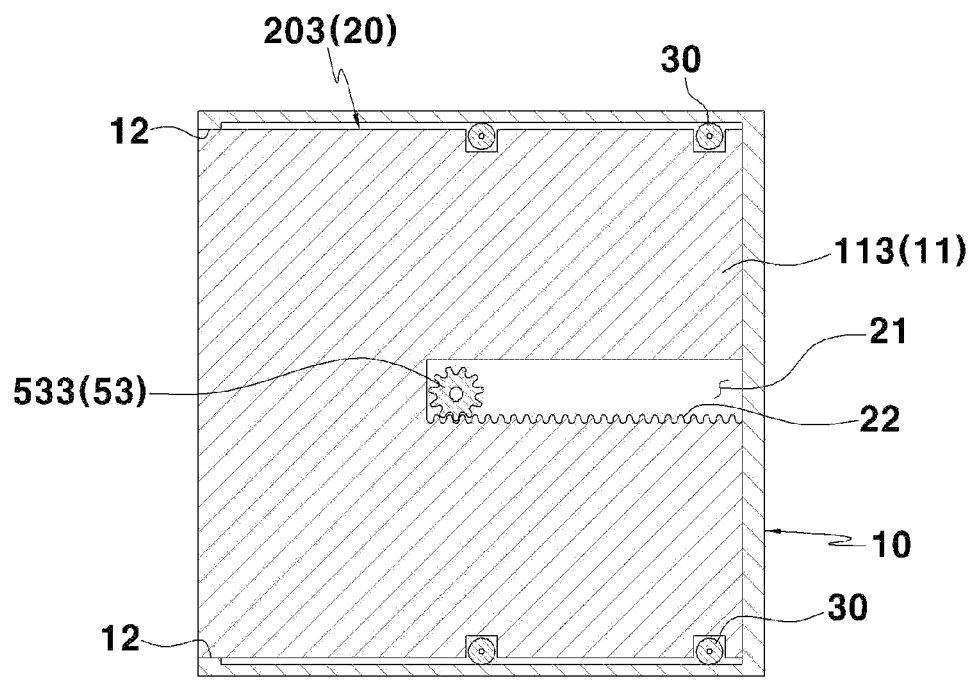
FIG. 15 is a plan sectional view illustrating an arrangement state of a third slider in the light blocking slider of the second modification example.
Figure 16:
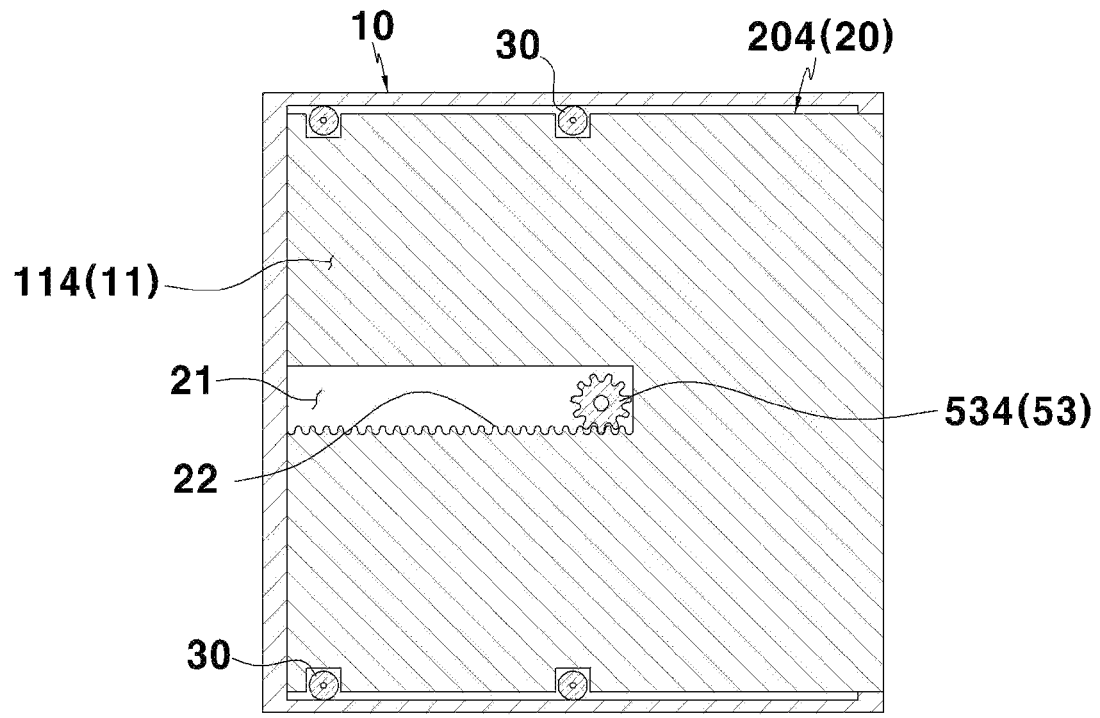
FIG. 16 is a plan sectional view illustrating an arrangement state of a fourth slider in the light blocking slider of the second modification example.
Figure 17:
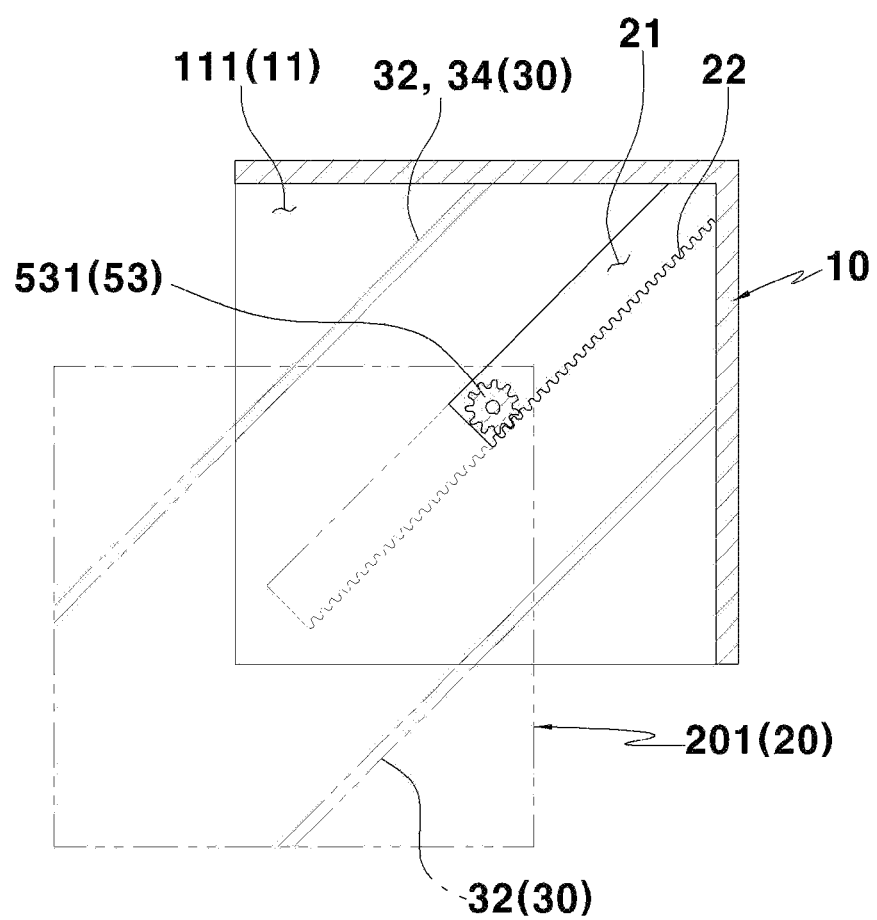
FIG. 17 is a plan sectional view illustrating an arrangement state of a first slider in a light blocking slider of a third modification example in the automatic light blocking device for vehicle according to the first embodiment of the present disclosure.
Figure 18:
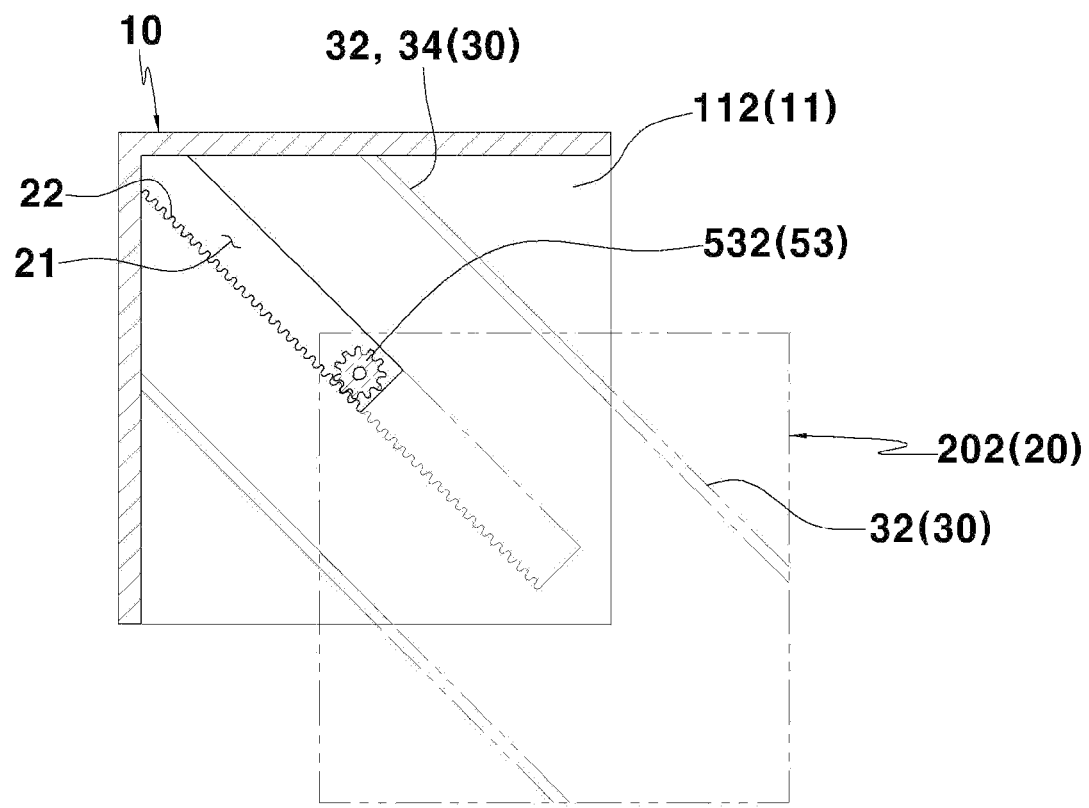
FIG. 18 is a plan sectional view illustrating an arrangement state of a second slider in the light blocking slider of the third modification example in the automatic light blocking device for vehicle according to the first embodiment of the present disclosure.
Figure 19:
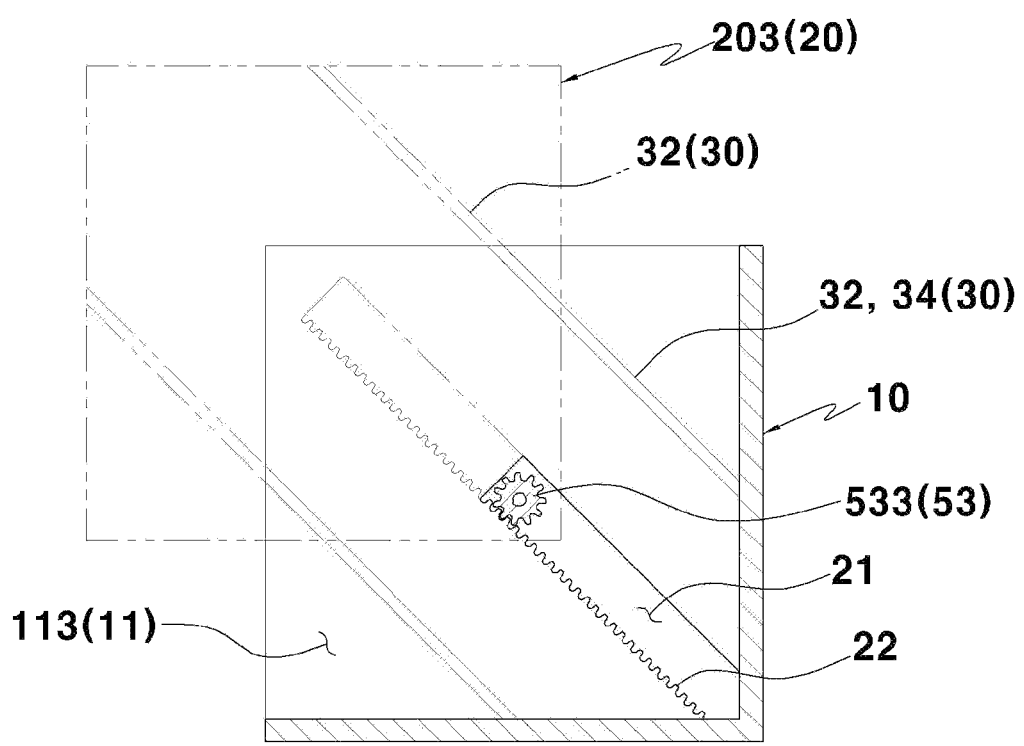
FIG. 19 is a plan sectional view illustrating an arrangement state of a third slider in the light blocking slider of the third modification example in the automatic light blocking device for vehicle according to the first embodiment of the present disclosure.
Figure 20:
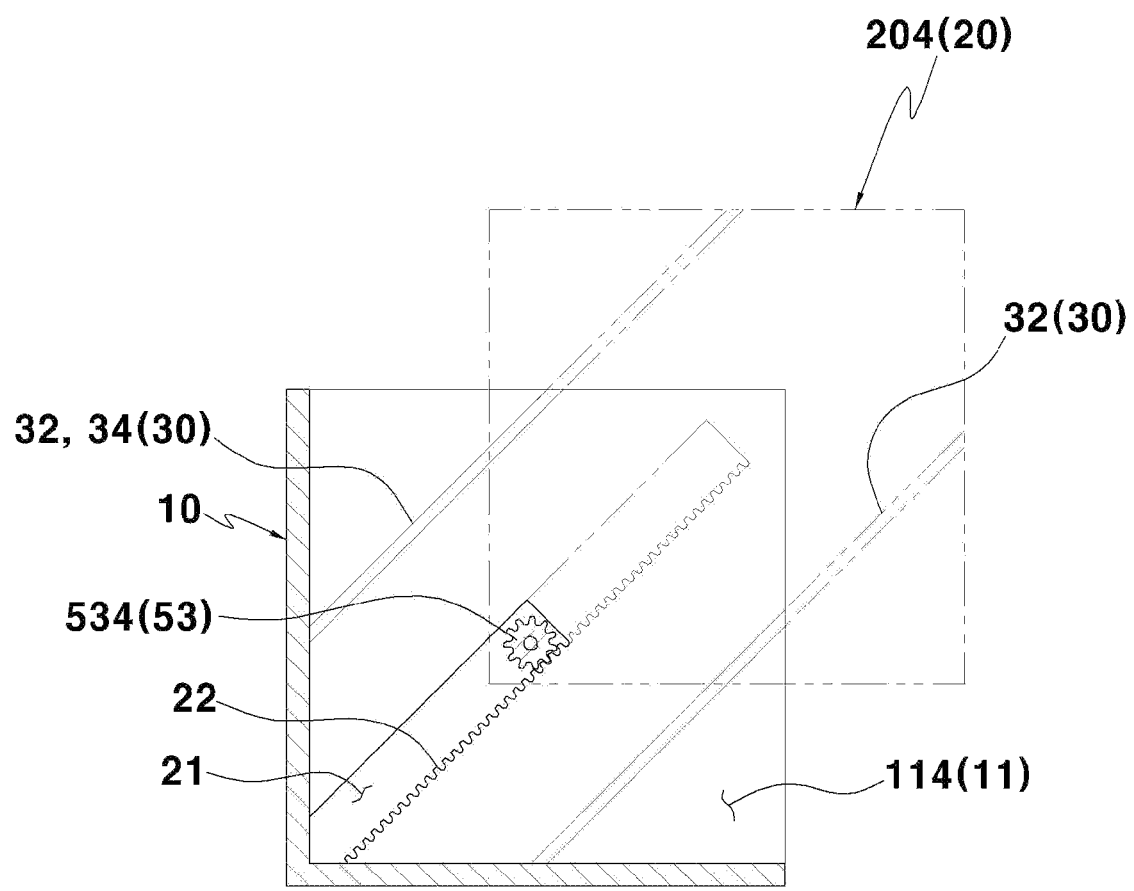
FIG. 20 is a plan sectional view illustrating an arrangement state of a fourth slider in the light blocking slider of the third modification example in the automatic light blocking device for vehicle according to the first embodiment of the present disclosure.

Referring to FIGS. 6 and 7, the lighting unit 60 may include a light emitting substrate 62 provided at a protruding end of the light blocking slider 20 and to which the power applied from the vehicle or the power of the battery (not shown) provided to the light blocking body 10 is applied, a light emitting portion 61 arranged on the light emitting substrate 62 and configured to emit light with the power, and a lighting switch 63 configured to adjust whether to apply the power to the light emitting substrate 62 or illuminance of the light emitting portion 61.

The lighting switch 63 may selectively operate depending on whether the light blocking slider 20 protrudes, a surrounding illuminance, and the like. Here, a lighting groove 20a in a recessed form on a surface that faces the ground is provided at an edge of a protruding end of the light blocking slider 20. The light emitting substrate 62 and the light emitting portion 61 may insert into the lighting groove 20a, thereby preventing the lighting unit 60 from interfering with the light blocking body 10 and simplifying installation of the lighting unit 60.

For example, when the light blocking slider 20 protrudes from the light blocking body 10, the lighting switch 63 may apply power to the light emitting substrate 62 such that light may be emitted from the light emitting portion 61. When the light blocking slider 20 inserts into the light blocking body 10, the lighting switch 63 may block the power applied to the light emitting substrate 62. Therefore, it is possible to block the light from being emitted from the light emitting portion 61.

Referring to FIGS. 8 to 11, an automatic light blocking device for vehicle according to a first modification example may include the light blocking body 10, the light blocking slider 20, and the driving unit 50, and may further include at least one of the guide unit 30, the detachable unit 40, and the lighting unit 60.

In the first modification example, two light blocking sliders 20 may be configured to protrude in a first direction and a second direction opposite to the first direction, respectively, through a single driving unit 50. Here, the second direction may be a direction crossing or perpendicular to the first direction.

In the automatic light blocking device for vehicle according to the first modification example, like reference numerals refer to like elements of the automatic light blocking device for vehicle according to the first embodiment of the present disclosure. Description related thereto is omitted.

Here, in the first modification example, the sliding groove 11 may include a first sliding groove 111 provided adjacent to the ceiling or roof of the vehicle and open in the first direction and a second sliding groove 112 stacked above the first sliding groove 11 to be separate therefrom and open in the second direction opposite to the first direction or crossing or perpendicular to the first direction.

Correspondingly thereto, in the first modification example, the light blocking slider 20 may include a first slider 201 configured to slidably insert into and couple to the first sliding groove 111 and a second slider 202 configured to slidably insert into and couple to the second sliding groove 112.

Also, in the first modification example, the driving gear 53 may include a first gear 531 configured to engage with the driving rack portion 22 provided to the first slider 201 in a state of being inserted into the driving groove portion 21 provided to the first slider 201 and a second gear 532 configured to engage with the driving rack portion 22 provided to the second slider 202 in a state of being inserted into the driving groove portion 21 provided to the second slider 202.

Referring to FIGS. 12 to 16, an automatic light blocking device for vehicle according to a second modification example may include the light blocking body 10, the light blocking slider 20, and the driving unit 50, and may further include at least one of the guide unit 30, the detachable unit 40, and the lighting unit 60.

In the second modification example, fourth light blocking sliders 20 are configured to protrude in a first direction, a second direction opposite to the first direction, and a third direction and a fourth direction crossing the first direction and the second direction, respectively, through a single driving unit 50. Here, the second direction may be a direction crossing or perpendicular to the first direction.

In the automatic light blocking device for vehicle according to the second modification example, like reference numerals refer to like elements of the automatic light blocking device for vehicle according to the first embodiment of the present disclosure or the first modification example. Description related thereto is omitted.

Here, in the second modification example, the sliding groove 11 may include the first sliding groove 111 provided adjacent to the ceiling or roof of the vehicle and open in the first direction, the second sliding groove 112 stacked above the first sliding groove 11 to be separate therefrom and open in the second direction opposite to the first direction or crossing or perpendicular to the first direction, a third sliding groove 113 stacked above the second sliding groove 11 to be separate therefrom and open in the third direction opposite to the second direction or crossing the second direction, and a fourth sliding groove 114 stacked above the third sliding groove 11 to be separate therefrom and open in the fourth direction opposite to the third direction or crossing the third direction.

Here, the first direction, the second direction, the third direction, and the fourth direction may be expressed as directions that protrude from four sides of the light blocking body 10 having a rectangular plane, respectively.

Correspondingly thereto, in the second modification example, the light blocking slider 20 may include the first slider 201 configured to slidably insert into and couple to the first sliding groove 111, the second slider 202 configured to slidably insert into and couple to the second sliding groove 112, a third slider 203 configured to slidably insert into and couple to the third sliding groove 113, and a fourth slider 204 configured to slidably insert into and couple to the fourth sliding groove 114.

Also, in the second modification example, the driving gear 53 may include the first gear 531 configured to engage with the driving rack portion 22 provided to the first slider 201 in a state of being inserted into the driving groove portion 21 provided to the first slider 201, the second gear 532 configured to engage with the driving rack portion 22 provided to the second slider 202 in a state of being inserted into the driving groove portion 21 provided to the second slider 202, a third gear 533 configured to engage with the driving rack portion 22 provided to the third slider 203 in a state of being inserted into the driving groove portion 21 provided to the third slider 203, and a fourth gear 534 configured to engage with the driving rack portion 22 provided to the fourth slider 204 in a state of being inserted into the driving groove portion 21 provided to the fourth slider 204.

Referring to FIGS. 17 to 20, an automatic light blocking device for vehicle according to a third modification example may include the light blocking body 10, the light blocking slider 20, and the driving unit 50, and may further include at least one of the guide unit 30, the detachable unit 40, and the lighting unit 60.

In the third modification example, four light blocking sliders 20 are configured to protrude in a first direction, a second direction opposite to the first direction, and a third direction and a fourth direction crossing the first direction and the second direction, respectively, through a single driving unit 50. Here, the second direction may be a direction crossing or perpendicular to the first direction.

In the automatic light blocking device for vehicle according to the third modification example, like reference numerals refer to like elements of the automatic light blocking device for vehicle according to the first embodiment of the present disclosure, the first modification example, or the second modification example. Description related thereto is omitted.

Here, in the third modification example, the sliding groove 11 may include the first sliding groove 111 provided adjacent to the ceiling or roof of the vehicle and open in the first direction, the second sliding groove 112 stacked above the first sliding groove 11 to be separate therefrom and open in the second direction opposite to the first direction or crossing or perpendicular to the first direction, the third sliding groove 113 stacked above the second sliding groove 11 to be separate therefrom and open in the third direction opposite to the second direction or crossing the second direction, and the fourth sliding groove 114 stacked above the third sliding groove 11 to be separate therefrom and open in the fourth direction opposite to the third direction or crossing the third direction.

Here, the first direction, the second direction, the third direction, and the fourth direction may be expressed as directions that protrude from four sides of the light blocking body 10 having a rectangular plane, respectively.

Correspondingly thereto, in the third modification example, the guide unit 30 may include a guide protrusion portion 32 configured to be separate from one side or both sides of the driving unit 50 to be parallel to the sliding direction of the light blocking slider 20 and to protrude from one of the light blocking body 10 and the light blocking slider 20 and a guide slit portion 34 formed in a recessed form in the other one of the light blocking body 10 and the light blocking slider 20 to be slidable in a state of being inserted into and coupled to the guide protrusion portion 32.

Also, in the third modification example, the light blocking slider 20 may include the first slider 201 configured to slidably insert into and couple to the first sliding groove 111, the second slider 202 configured to slidably insert into and couple to the second sliding groove 112, the third slider 203 configured to slidably insert into and couple to the third sliding groove 113, and the fourth slider 204 configured to slidably insert into and couple to the fourth sliding groove 114.

Also, in the third modification example, the driving gear 53 may include the first gear 531 configured to engage with the driving rack portion 22 provided to the first slider 201 in a state of being inserted into the driving groove portion 21 provided to the first slider 201, the second gear 532 configured to engage with the driving rack portion 22 provided to the second slider 202 in a state of being inserted into the driving groove portion 21 provided to the second slider 202, the third gear 533 configured to engage with the driving rack portion 22 provided to the third slider 203 in a state of being inserted into the driving groove portion 21 provided to the third slider 203, and the fourth gear 534 configured to engage with the driving rack portion 22 provided to the fourth slider 204 in a state of being inserted into the driving groove portion 21 provided to the fourth slider 204.

Figure 21:
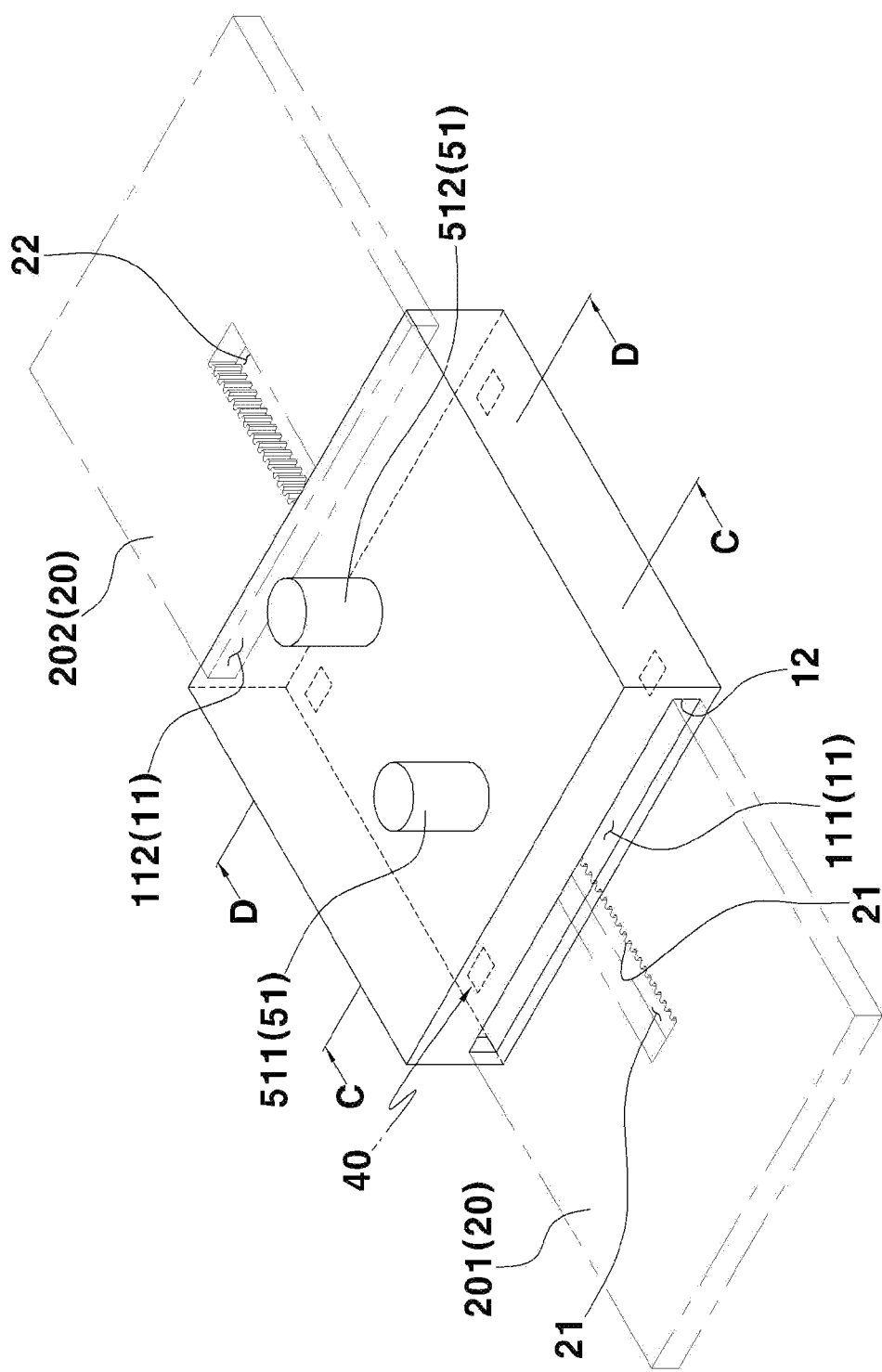
FIG. 21 is a perspective view illustrating an automatic light blocking device for vehicle according to a second embodiment of the present disclosure.
Figure 22:
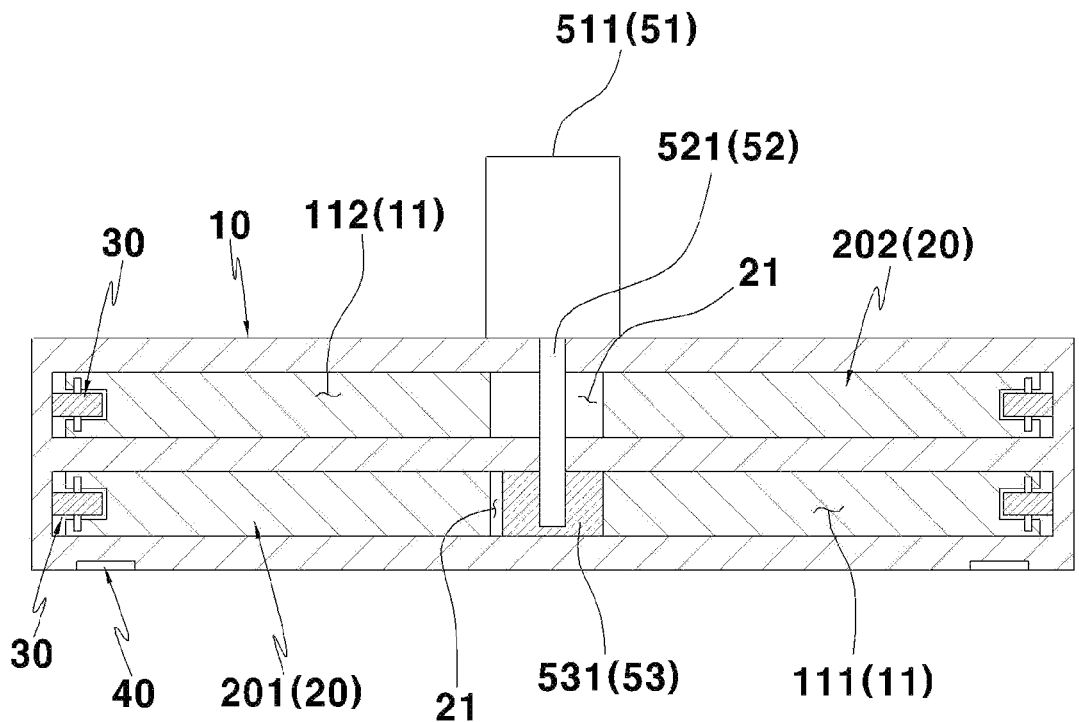
FIG. 22 is a longitudinal sectional view cut along a line C-C of FIG. 21.
Figure 23:
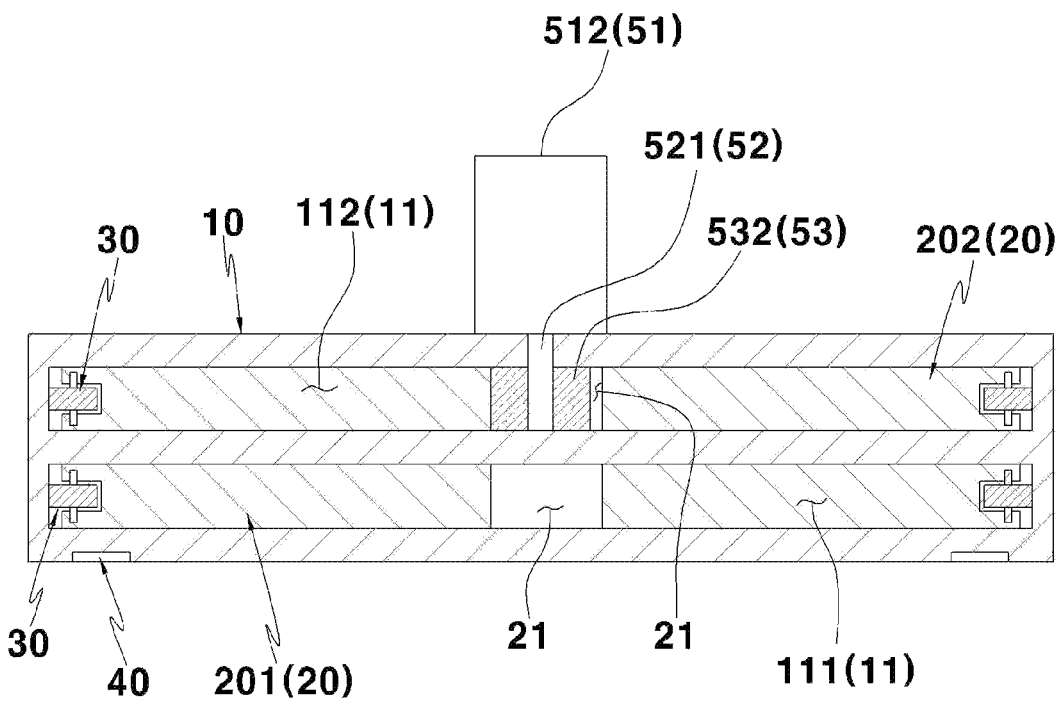
FIG. 23 is a longitudinal sectional view cut along a line D-D of FIG. 21.
Figure 24:
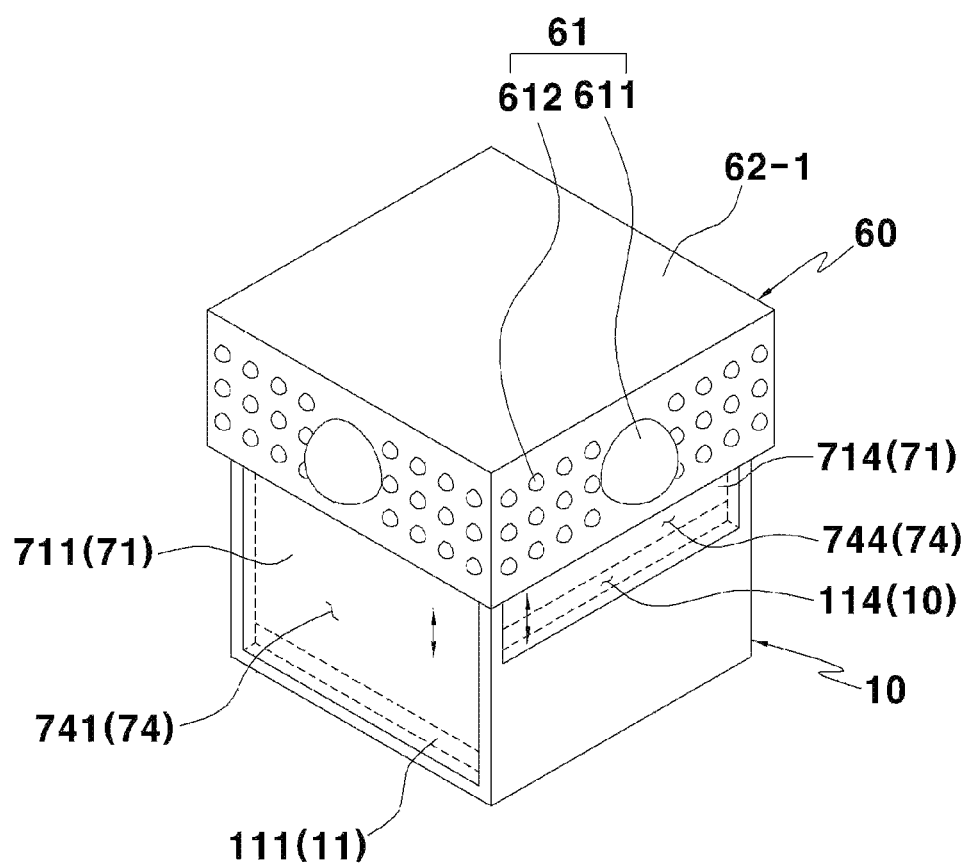
FIG. 24 is a perspective view illustrating an automatic light blocking device for vehicle according to a third embodiment of the present disclosure.
Figure 25:
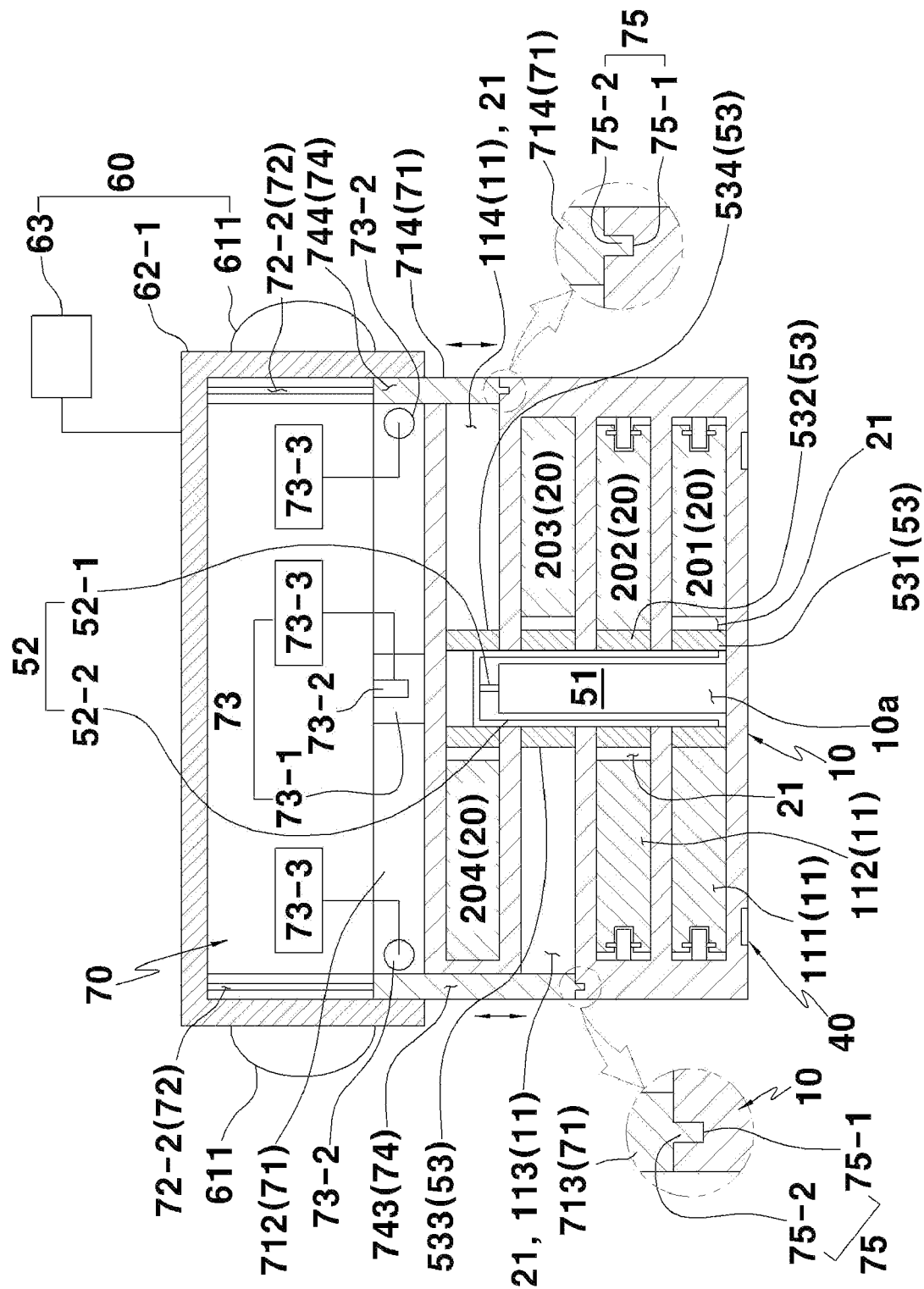
FIG. 25 is a longitudinal sectional view illustrating the automatic light blocking device for vehicle according to the third embodiment of the present disclosure.
Figure 26:
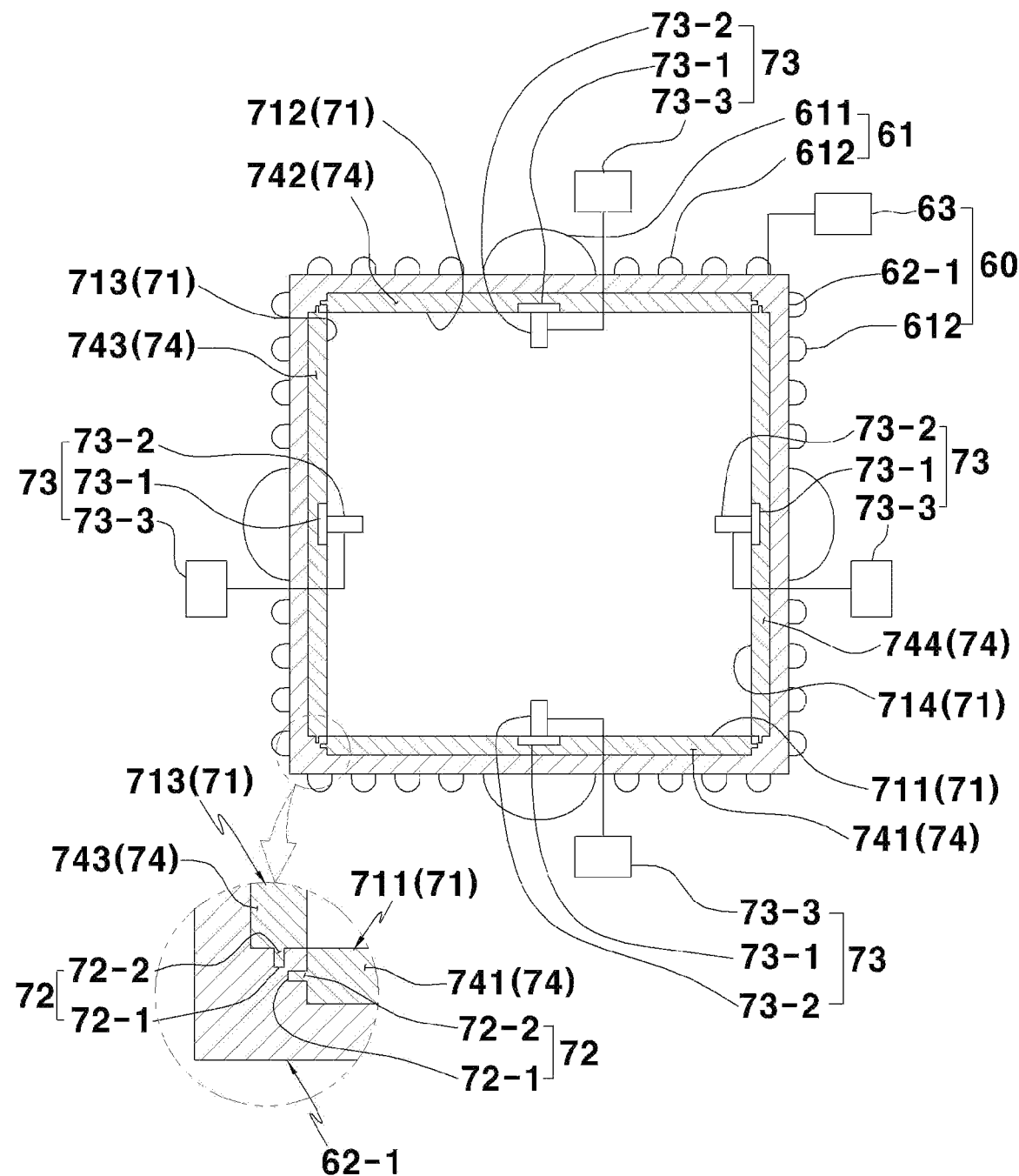
FIG. 26 is a plan sectional view of a light emitting housing schematically illustrating a coupling state of an opening and closing door as an internal configuration of the light emitting housing in the automatic light blocking device for vehicle according to the third embodiment of the present disclosure.
Figure 27:
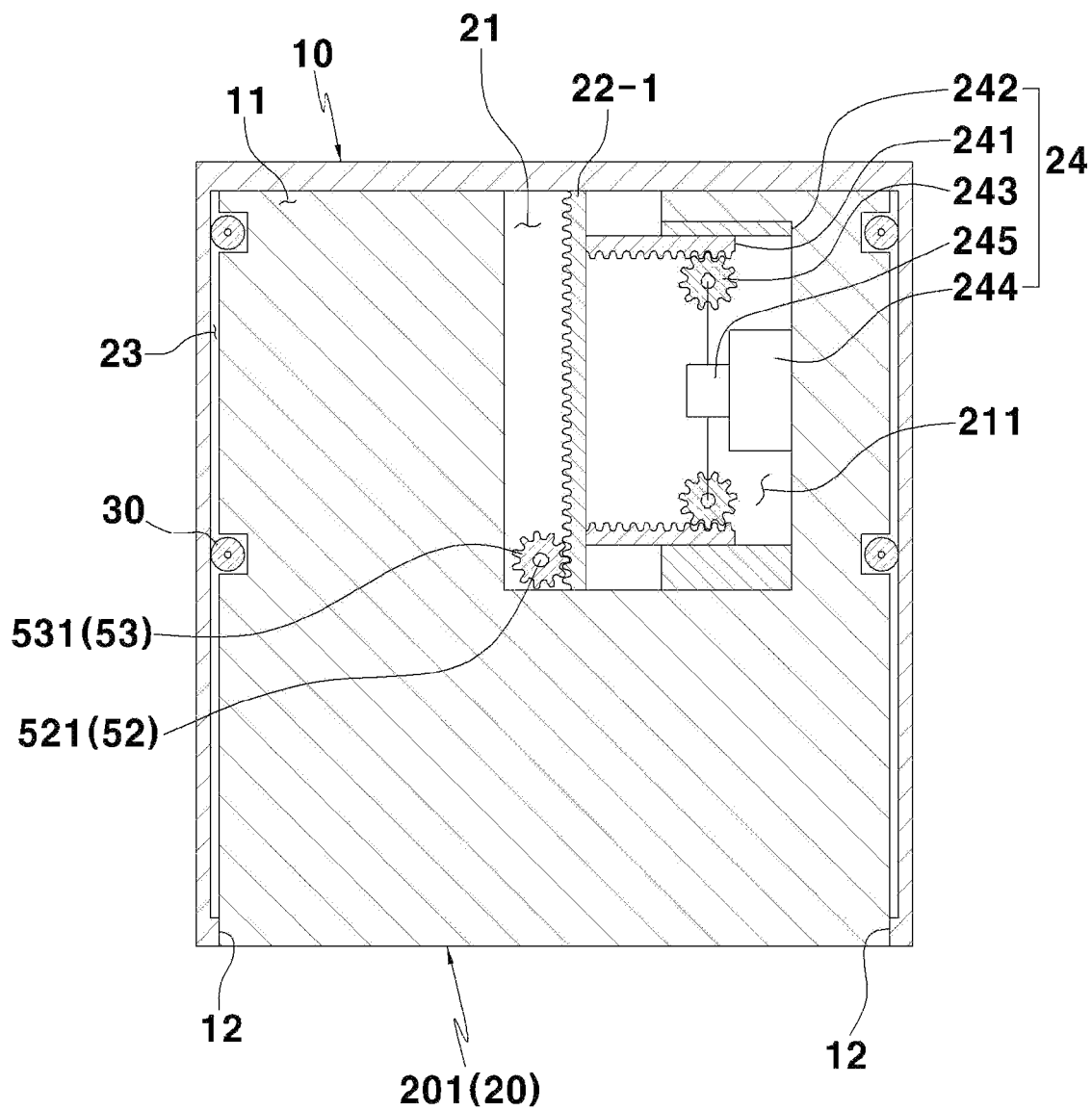
FIG. 27 is a plan sectional view illustrating a modification example of a light blocking slider in the automatic light blocking device for vehicle according to the third embodiment of the present disclosure.

Referring to FIGS. 21 to 23, an automatic light blocking device for vehicle according to a second embodiment of the present disclosure may include the light blocking body 10, the light blocking slider 20, and the driving unit 50, and may further include at least one of the guide unit 30, the detachable unit 40, and the lighting unit 60.

In the second embodiment of the present disclosure, a number of driving units 50 one-to-one corresponding to a number of light blocking sliders 20 may be provided and two light blocking sliders 20 may be configured to protrude in a first direction and a second direction opposite to the first direction, respectively, through the respective driving units 50. Here, the second direction may be a direction crossing or perpendicular to the first direction.

In the automatic light blocking device for vehicle according to the second embodiment of the present disclosure, like reference numerals refer to like elements of the automatic light blocking device for vehicle according to the first embodiment of the present disclosure, the first modification example, the second modification example, or the third modification example.

Description related thereto is omitted.

Here, in the second embodiment of the present disclosure, the sliding groove 11 may include the first sliding groove 111 provided adjacent to the ceiling or roof of the vehicle and open in the first direction and the second sliding groove 112 stacked above the first sliding groove 11 to be separate therefrom and open in the second direction opposite to the first direction or crossing or perpendicular to the first direction.

Correspondingly thereto, in the second embodiment of the present disclosure, the light blocking slider 20 may include the first slider 201 configured to slidably insert into and couple to the first sliding groove 111 and the second slider 202 configured to slidably insert into and couple to the second sliding groove 112.

Also, in the second embodiment of the present disclosure, with respect to the driving unit 50 that includes the driving portion 51, the driving shaft 52, and the driving gear 53, the driving unit 50 may include a first unit configured to slide the first slider 201 in the light blocking body 10 and a second unit configured to slide the second slider 202 in the light blocking body 10.

However, the second embodiment of the present disclosure is not limited thereto and may stack at least two light blocking sliders 20, which is similar to the second modification example and the third modification example.

Accordingly, in the second embodiment of the present disclosure, with respect to the driving unit 50 that includes the driving portion 51, the driving shaft 52, and the driving gear 53, the driving unit 50 may include at least the first unit and the second unit among the first unit configured to slide the first slider 201 in the light blocking body 10, the second unit configured to slide the second slider 202 in the light blocking body 10, a third unit configured to slide the third slider 203 in the light blocking body 10, and a fourth unit configured to slide the fourth slider 204 in the light blocking body 10.

In response to the driving unit 50 including the driving portion 51, the driving shaft 52, and the driving gear 53, the first unit may include a first driving motor 511, a first shaft 521, and the first gear 531, the second unit may include a second driving motor 512, a second shaft 522, and the second gear 532, the third unit may include a third driving motor, a third shaft, and a third gear, and the fourth unit may include a fourth driving motor, a fourth shaft, and a fourth gear.

Referring to FIGS. 24 to 27, an automatic light blocking device for vehicle according to a third embodiment of the present disclosure may include the light blocking body 10, the light blocking slider 20, and the driving unit 50, and may further include at least one of the guide unit 30, the detachable unit 40, and the lighting unit 60.

In the third embodiment of the present disclosure, four light blocking sliders 20 may be configured to protrude in a first direction, a second direction opposite to the first direction, and a third direction and a fourth direction crossing the first direction and the second direction, respectively, through a single driving unit 50. Here, the second direction may be a direction crossing or perpendicular to the first direction.

In the automatic light blocking device for vehicle according to the third embodiment of the present disclosure, like reference numerals refer to like elements of the automatic light blocking device for vehicle according to the first embodiment of the present disclosure, the first modification example, the second modification example, the third modification embodiment, or the second embodiment. Description related thereto is omitted.

Here, in the third embodiment of the present disclosure, the driving portion 51 and the driving shaft 52 of the driving unit 50 may insert into the light blocking body 10. In detail, a unit receiving groove portion 10*a* may be formed in a recessed or penetrating form in the light blocking body 10. Here, the driving portion 51 may insert into and thereby be supported by the unit receiving groove portion 10*a* and the driving shaft 52 may rotatably wrap around the driving portion 51. For example, the driving shaft 52 may include a main shaft portion 52-1 configured to form a center of rotation to be rotatable by the driving portion 51 and a shaft drum portion 52-2 configured to couple to the main shaft portion 52-1 to rotatably wrap around the driving portion 51 and to rotate with the main shaft portion 52-1 in the unit receiving groove portion 10*a*.

In the third embodiment of the present disclosure, the lighting unit 60 is provided on the light blocking body 10. Therefore, the lighting unit 60 may further brightly illuminate sorrowings of the vehicle. The lighting unit 60 may emit light with the power applied from the vehicle or the power of the separate battery (not shown) provided to the light blocking body 10. The lighting unit 60 may emit light toward the ground. The lighting unit 60 may select whether to emit the light depending on whether the light blocking slider 20 protrudes. As another representation, the light may be emitted from the lighting unit 60 in a state in which the light blocking slider 20 is protruded, and the power of the lighting unit 60 may be blocked in a state in which the light blocking slider 20 is inserted. The lighting unit 60 may select whether to emit the light based on surrounding illuminance. As another representation, the lighting unit 60 may not emit light during a daytime and may emit the light after sunset. The lighting unit 60 may adjust illuminance of light emitted based on the surrounding illuminance. The lighting unit 60 may select whether to emit light through a separate switch (not shown) or may adjust the illuminance of light emitted.

Referring to FIGS. 24 to 27, the lighting unit 60 may include a light emitting switch 62-1 provided on the blocking body 10, a light emitting substrate (not shown and refer to reference numeral 62 of FIGS. 6 and 7) to which the power applied from the vehicle or the power of the battery (not shown) provided to the light blocking body 10 is applied, the light emitting portion 61 arranged on the light emitting substrate and configured to emit light with the power, and the lighting switch 63 configured to adjust whether to apply power to the light emitting substrate or illuminance of the light emitting portion 61.

The light emitting housing 62-1 may be provided in a hollow encloser that protrudes from above the light blocking body 10.

The light emitting portion 61 may be exposed to an outside of the light emitting housing 62-1. Here, the light emitting portion 61 may include a main light 611 configured to emit light for search toward front of an outer side of the light emitting housing 62-1 and sub lights 612 arranged on both sides of the main light 611 and configured to emit light for warning. The main light 611 may be used as a search light and the sub light 612 may be used as a warning light. Here, ON/OFF of the main light 611 and the sub light 612 or illuminance of light may be adjusted by the lighting switch 63.

The lighting switch 63 may selectively operate depending on whether the light blocking slider 20 protrudes or surrounding illuminance.

For example, the light emitting portion 61 may emit light or adjust illuminance of light being emitted based in surrounding illuminance.

In the third embodiment of the present disclosure, the driving rack portion 22 may adjust a width of the sliding groove 11. Therefore, when a single driving unit 50 operates, it may operate a plurality of light blocking sliders 20 individually.

In detail, a rack flow portion 211 communicating with the driving groove portion 21 is provided to the light blocking slider 20. Here, the driving rack portion 22 may include a sliding rack portion 22-1 configured to slidably couple to the rack flow portion 211 and a rack coupling unit 24 configured to slide the sliding rack portion 22-4 based on the light blocking slider 20 to detachably couple the sliding rack portion 22-1 and the driving gear 53.

The rack coupling unit 24 may include a coupling rack portion 241 configured to protrude from the sliding rack portion 22-1 in the rack flow portion 211, a coupling rack guide portion 242 configured to support the coupling rack portion 241 to be slidable in the rack flow portion 211, a coupling pinion portion 243 configured to gear-couple to the coupling rack portion 241 in the rack flow portion 211, and a coupling pinion driving portion 244 configured to rotate the coupling pinion portion 243 in a state in which the coupling pinion portion 244 is supported by the rack flow portion 211 for sliding of the sliding rack portion 22-1.

Here, each of the coupling rack guide portion 242 and the coupling pinion portion 243 may be provided as a single pair separate from each other. Here, the rack coupling unit 24 may further include a coupling pinion rotator 245 configured to transmit a rotational force of the coupling pinion driving portion 244 to a pair of coupling pinion portions 243, thereby preventing tilting of the sliding rack portion 22-1. Various types of power transmission methods (gear coupling, coupling of a chain and a sprocket, and coupling of a belt and a pulley) may be applied to the coupling pinion rotator 245.

The automatic light blocking device for vehicle according to the third embodiment may further include a groove opening and closing unit 70. The groove opening and closing unit 70 may be slidably coupled to the side of the light blocking body 10 and open and close the sliding groove 11 that is open in the light blocking body 10, thereby preventing air or foreign substance from flowing into the sliding groove 11 at a time of vehicle driving, decreasing resistance of wind, preventing noise by air that flows into the sliding groove 11, and preventing a decrease in a coupling force between the vehicle and the light blocking body 10.

The groove opening and the closing unit 70 may include an opening and closing door 71 configured to slidably couple to the side of the light blocking body 10 to correspond to the sliding groove 11 and a door driving portion 73 configured to slide the opening and closing door 71 with the power applied from the vehicle or the power of the battery (not shown) provided to the light blocking body 10. Here, a number of door driving portions 73 may be provided based on a one-to-one correspondence with respect to a number of opening and closing doors 71. Alternatively, a single door driving portion 73 may collectively operate a plurality of opening and closing doors 71.

The door driving portion 73 may include a door rack portion 73-1 provided to the opening and closing door 71, a door pinion portion 73-2 configured to gear-couple to the door rack portion 73-1, and a door pinion driving portion 73-3 configured to rotate the door pinion portion 73-2 above the light blocking body 10 for sliding of the opening and closing door 71. Although not illustrated, the door driving portion 73 may further include a door pinion rotator (not shown) configured to transmit a rotational force of the door pinion driving portion 73-3 to the corresponding door pinion portion 73-2 or the entire door pinion portions 73-2 and thereby may adjust an individual operation of the opening and closing door 71 or the collective operation of the opening and closing doors 71 in correspondence to the sliding groove 11. Various types of known power transmission methods (gear coupling, coupling of a chain and a sprocket, and coupling of a belt and a pulley) may be applied to the door pinion rotator (not shown).

The groove opening and closing unit 70 may further include at least one of the light emitting housing 62-1 provided on the light blocking body 10 such that the opening and closing door 71 may be supported to be slidable and a door path groove 74 formed in a recessed form on the side of the light blocking body 10 such that the opening and closing door 71 may be slidably inserted and supported. Accordingly, it is possible to improve a coupling force between the opening and closing door 71 and the light blocking body 10 and to prevent the opening and closing door 71 from being spaced apart or separated from the light blocking body 10.

Here, a door guide portion 72 configured to couple the opening and closing door 71 to be slidable in the light emitting housing 62-1 may be provided between the light emitting housing 62-1 and the opening and closing door 71. The door guide portion 72 may include a guide protrusion portion 72-1 configured to protrude from one of an inner side of the light emitting housing 62-1 and a side of the opening and closing door 71 and a guide groove portion 72-2 formed in a recessed form on the other one of the inner side of the light emitting housing 62-1 and the side of the opening and closing door 71 to slidably insert into and couple to the guide protrusion portion 72-1. Accordingly, it is possible to stabilize sliding of the opening and closing door 71 in the inner side of the light emitting housing 62-1 and to prevent separation of the opening and closing door 71.

Also, the door guide portion 72 configured to couple the opening and closing door 71 to be slidable in the door path groove 74 may be provided between the door path groove 74 and the opening and closing door 71. The door guide portion 72 may include the guide protrusion portion 72-1 configured to protrude from one of an inner side of the door path groove 74 and the side of the opening and closing door 71 and a guide groove portion 72-2 formed in a recessed form on the other one of the inner side of the door path groove 74 and the side of the opening and closing door 71 to slidably insert into and couple to the guide protrusion portion 72-1. Accordingly, it is possible to stabilize sliding of the opening and closing door 71 in the door path groove 74 and to prevent separation of the opening and closing door 71.

Also, a door stopping portion 75 configured to detachably fasten the opening and closing door 71 in the door path groove 74 when the opening and closing door 71 closes the sliding groove 11 may be provided between the door path groove 74 and the opening and closing door 71. The door stopping portion 75 may include a stopping protrusion 75-1 configured to protrude from one of a lower side surface of the door path groove 74 and a lower end surface of the opening and closing door 71 and a stopping groove portion 75-2 configured to protrude from the other one of the lower side surface of the door path groove 74 and the lower end surface of the opening and closing door 71 to detachably insert into and couple to the stopping protrusion 75-1. Accordingly, when the stopping protrusion 75-1 inserts into and couples to the stopping groove portion 75-2, it is possible to stably fasten the opening and closing door 71 in the door path groove 74 and to prevent shaking of the opening and closing door 71 by the wind and to prevent air or foreign substance from flowing into the sliding groove 11.

In the third embodiment of the present disclosure, the light blocking slider 20 represents a 4-tiered structure, the opening and closing door 71 may be classified into a first door 711 configured to open and close the first sliding groove 111, a second door 722 configured to open and close the second sliding groove 112, a third door 713 configured to open and close the third sliding groove 113, and a fourth door 714 configured to open and close the fourth sliding groove 114. Also, the door path groove 74 may be classified into a first path groove 741 in which the first door 711 is inserted and supported, a second path groove 742 in which the second door 712 is inserted and supported, a third path groove 743 in which the third door 713 is inserted and supported, and a fourth path groove 744 in which the fourth door 714 is inserted and supported.

According to the aforementioned automatic light blocking device for vehicle, since the light blocking slider 20 protrudes in a sliding manner from the ceiling or roof of the vehicle, it is possible to block sunlight from being emitted to an interior of the vehicle.

Also, since at least two light blocking sliders 20 are provided, it is possible to block sunlight in at least two directions among front, rear, left, and right, based on front of a driver.

Also, since the light blocking body 10 is installed on the ceiling or roof of the vehicle, it is possible to prevent sunlight from being emitted toward the ceiling or roof and to prevent an excessive increase in an indoor temperature of the vehicle by reducing radiant heat generated by the sunlight.

Also, it is possible to limit a protruding amount of the light blocking slider 20 from the light blocking body 10 and to prevent the light blocking slider 20 from being separated from the light blocking body 10 through the locking protrusion 12.

Also, when the light blocking slider 20 slides through an installation position of the driving groove and the guide unit 30, it is possible to minimize the eccentric load and to prevent the light blocking slider 20 from rotating based on the driving gear 53.

Also, it is possible to stabilize sliding of the light blocking slider 20 in the light blocking body 10 and to suppress or prevent flow of the light blocking slider 20 through the guide unit 30.

Also, it is possible to simplify attachment and detachment of the light blocking body 10 to or from the ceiling or roof of the vehicle and to stably fasten the light blocking body 10 to the ceiling or roof of the vehicle through the detachable unit 40.

Also, it is possible to improve fastening power of the light blocking body 10 on the ceiling or roof of the vehicle made of a metal material through the detachable unit 40 and to adjust the magnetic force of the permanent magnet 43 on the ceiling or roof of the vehicle.

Also, it is possible to automate sliding of the light blocking slider 20 through the driving unit 50 and to prevent a safety accident of a driver when the light blocking slider 20 operates.

Herein, the vehicle may be a passenger vehicle or a heavy equipment vehicle.

As described above, although example embodiments of the present disclosure are described with reference to the accompanying drawings, it will be apparent to those skilled in the art that various modifications or changes may be made to the present disclosure without departing from the spirit and scope of the present disclosure described in the following claims.

INDUSTRIAL APPLICABILITY

An automatic light blocking device for vehicle according to the present disclosure relates to a structure installed on a ceiling or roof of a vehicle to block sunlight from being emitted to an interior of the vehicle.

What is claimed is:

1. An automatic light blocking device for vehicle, the automatic light blocking device comprising:
    a light blocking body provided to a ceiling or roof of a vehicle and having at least one sliding groove that is open in a direction in which light is to be blocked;
    a light blocking slider configured to slidably insert into and couple to the at least one sliding groove; and
    a driving unit configured to slide the light blocking slider in the light blocking body with power applied from the vehicle or power of a battery provided to the light blocking body,
    wherein the light blocking slider comprises:
    a driving groove portion formed in parallel to a sliding direction of the light blocking slider in correspondence to a sliding amount of the light blocking slider;
    a driving rack portion provided to one side of the driving groove portion: and
    a rack flow portion configured to communicate with the at least one sliding groove, and
    wherein the driving unit comprises:
    a driving portion configured to generate a rotational force with the power applied from the vehicle or the power of the battery provided to the light blocking body;
    a driving shaft configured to rotate with the rotational force generated by the driving portion; and
    a driving gear configured to couple to the driving shaft and to engage with the driving rack portion in a state of being inserted into the driving groove portion,
    wherein the driving rack portion comprises:
    a sliding rack portion configured to slidably couple to the rack flow portion: and
    a rack coupling unit configured to slide the sliding rack portion based on the light blocking slider for detachably coupling of the sliding rack portion and the driving gear, and
    wherein the rack coupling unit comprises:
    a coupling rack portion configured to protrude from the sliding rack portion in the rack flow portion;
    a coupling rack guide portion configured to support the coupling rack portion to be slidable in the rack flow portion;
    a coupling pinion portion configured to gear-couple to the coupling rack portion in the rack flow portion; and
    a coupling pinion driving portion configured to rotate the coupling pinion portion in a state of being supported by the rack flow portion for sliding of the sliding rack portion.

2. The automatic light blocking device of claim 1, wherein the at least one sliding groove comprises at least a first sliding groove and a second sliding groove among
    the first sliding groove provided adjacent to the ceiling or roof of the vehicle and open in a first direction;
    the second sliding groove stacked above the first sliding groove to be separate therefrom and open in a second direction opposite to the first direction or crossing the first direction;
    a third sliding groove stacked above the second sliding groove to be separate therefrom and open in a third direction opposite to the second direction or crossing the second direction; and
    a fourth sliding groove stacked above the third sliding groove to be separate therefrom and open in a fourth direction opposite to the third direction or crossing the third direction.

3. The automatic light blocking device of claim 2, wherein the light blocking slider comprises at least a first slider and a second slider among
    the first slider configured to slidably insert into and couple to the first sliding groove;
    the second slider configured to slidably insert into and couple to the second sliding groove;
    a third slider configured to slidably insert into and couple to the third sliding groove; and a fourth slider configured to slidably insert into and couple to the fourth sliding groove, and the driving unit comprises at least a first unit and a second unit among the first unit configured to slide the first slider in the light blocking body;

the second unit configured to slide the second slider in the light blocki body;

a third unit configured to slide the third slider in the light blocking body; and a fourth unit configured to slide the fourth slider in the light blocking body.

4. The automatic light locking device according to claim 1, further comprising:

a guide unit configured to guide a sliding of the light blocking slider in the light blocking body, wherein the guide unit comprises:

a guide groove portion provided to one side or both sides of the light blocking slider parallel to the sliding direction of the light blocking slider;

a guide roller portion configured to rotatably insert into and couple to the guide, groove portion; and a guide shaft portion configured to form a center of rotation of the guide roller portion and to connect the guide roller portion to the light blocking slider, and a portion of the guide roller portion protrudes from the light blocking slider and is supported by an inner wall of the at least one sliding groove.

5. The automatic light blocking device of claim 4, wherein the guide unit comprises:

a guide protrusion portion configured to be separate from one side or both sides of the driving unit to be parallel to the sliding direction of the light blocking slider and to protrude from one of the light blocking body and the light blockin slider; and a guide slit portion formed in a recessed form in the other one of the light blocking body and the light blocking slider to be slidable in a state of being inserted into and coupled to the guide protrusion portion.

6. The automatic light blocking device according to claim 1, further comprising:

a detachable unit configured to detachably couple the light blocking body to the ceiling or roof of the vehicle using a magnetic force, wherein the detachable unit comprises:

a switching block provided to the light blocking body in a state in which a switching hole is penetrated or recessed;

a permanent magnet having a magnetic force and configured to rotatably insert into and couple to the switching hole; and a switching lever configured to couple to the permanent magnet for forward and reverse rotation of the permanent magnet, and the switching block is magnetized by the permanent magnet or the magnetized switching block is demagnetized according to the forward and reverse rotation of the permanent magnet.

7. The automatic light blocking device according to claim further comprising:

a lighting unit provided in an upper portion of the light blocking body or provided to the light blocking slider and configured to emit light with the power applied from the vehicle or the power of the battery provided to the light blocking body.

8. The automatic light blocking device of claim 7, wherein the lighting unit comprises:

a light emitting substrate provided at a protruding end of the light blocking slider and to which the power applied from the vehicle or the power of the battery provided to the light blocking body is applied;

a light emitting portion arranged on the light emitting substrate and configured to emit light with the power; and a lighting switch configured to adjust whether to apply the power the light emitting substrate or illuminance of the light emitting portion.

9. The automatic light blocking device of claim 7, wherein the lighting unit comprises:

alight emitting housing provided on the light blocking body;

a light emitting substrate provided to the light emitting housing and to which the power applied from the vehicle or the power of the battery provided to the light blocking body is applied;

a light emitting portion arranged on the light emitting substrate and configured to emit light with the power; and a lighting switch configured to adjust whether to apply the power to the light emitting substrate or illuminance of the light emitting portion.

10. The automatic light blocking device according to claim 1, wherein the driving portion and the driving shaft are configured to insert into the light blocking body.

11. The automatic light blocking device according to claim 1, wherein the light blocking slider is configured to form a downward slope by its own weight when the light blocking slider protrudes outward from the light blocking body.

12. An automatic light blocking device for vehicle, the automatic light blocking device comprising:

a light blocking body provided to a ceiling or roof of a vehicle and having at least one sliding groove that is open in a direction in which light is to be blocked:

a light blocking slider configured to slidablv insert into and couple to the at least one sliding groove; and a driving unit configured to slide the light blocking slider in the light blocking body with power applied from the vehicle or power of a battery provided to the light blocking body, wherein the light blocking slider comprises:

a driving groove portion formed in parallel to a sliding direction of the light blocking slider in correspondence to a sliding amount of the light blocking slider: and a driving rack portion provided to one side of the driving groove portion, and wherein the driving unit comprises:

a driving portion configured to generate a rotational force with the power applied from the vehicle or the power of the battery provided to the light blocking body;

a driving shaft configured to rotate with the rotational force generated by the driving portion; and a driving gear configured to couple to the driving shaft and to engage with the driving rack portion in a state of being inserted into the driving groove portion, wherein the automatic light blocking device further comprises a groove opening and closing unit configured to slidably couple to a side of the light blocking body and to open and close the at least one sliding groove, and wherein the groove opening and closing unit comprises:

an opening and closing door configured to slidably couple to the side of the light blocking body to correspond to the at least one sliding groove; and a door driving portion configured to slide the opening and closing door with the power applied from the vehicle or the power of the battery provided to the light blocking body.

13. The automatic light blocking device of claim 12, wherein the groove opening and dosing unit further comprises at least one of a light emitting housing provided on the light blocking body to support the opening and closing door to be slidable; and a door path groove formed in a recessed form on the side of the light blocking body such that the opening and closing door is inserted and supported to support the opening and closing door to be slidable.

* * * * *